US 11,593,850 B2

(12) United States Patent
van der Baan et al.

(10) Patent No.: US 11,593,850 B2
(45) Date of Patent: Feb. 28, 2023

(54) SYSTEMS AND METHODS FOR MANAGING DIRECT EXCHANGE

(71) Applicant: Swapretail, Inc., North Palm Beach, FL (US)

(72) Inventors: Melodie van der Baan, North Palm Beach, FL (US); Morgan Hatin Bodstrom, Palm Beach Gardens, FL (US); Damon Ciarelli, Los Angeles, CA (US)

(73) Assignee: Swapretail, Inc., North Palm Beach, FL (US)

( * ) Notice: Subject to any disclaimer, the term of this patent is extended or adjusted under 35 U.S.C. 154(b) by 0 days.

(21) Appl. No.: 17/536,704

(22) Filed: Nov. 29, 2021

(65) Prior Publication Data
US 2022/0084090 A1   Mar. 17, 2022

Related U.S. Application Data

(63) Continuation of application No. 16/355,500, filed on Mar. 15, 2019, now Pat. No. 11,188,960.

(51) Int. Cl.
*G06Q 30/06* (2012.01)
*G06Q 10/08* (2012.01)
(Continued)

(52) U.S. Cl.
CPC ....... *G06Q 30/0607* (2013.01); *G06Q 10/087* (2013.01); *G06Q 30/0613* (2013.01); *G06Q 30/0637* (2013.01)

(58) Field of Classification Search
CPC ............. G06Q 30/0607; G06Q 10/087; G06Q 30/0637; G06Q 30/0613
See application file for complete search history.

(56) References Cited

U.S. PATENT DOCUMENTS 6,751,597 B1 *  6/2004  Brodsky ............... G06Q 40/04
                                                      705/37
6,847,938 B1 *  1/2005  Moore ............... G06Q 30/0625
                                                      705/37
(Continued)

FOREIGN PATENT DOCUMENTS

CA        2550645 A1 *   6/2005  ............. G06Q 30/00
WO  WO-2005065386 A2 *   7/2005  ............. G06Q 30/02
WO  WO-2006083752 A2 *   8/2006  ............ G06Q 10/087

OTHER PUBLICATIONS

Jennifer Recktenwald. "Barters, swaps, and other twists on B2B e-commerce models". Retrieved from <https://www.techrepublic.com/article/barters-swaps-and-other-twists-on-b2b-e-commerce-models/> on Dec. 11, 2020. Originally published Dec. 1999. (Year: 1999).*

(Continued)

*Primary Examiner* — Nathan A Mitchell
(74) *Attorney, Agent, or Firm* — Wolf, Greenfield & Sacks, P.C.

(57) ABSTRACT

According to one aspect, the system provides an automated platform for managing R2R, that preserves vendor control over of the communication between retailers. For example, according to one embodiment of the system, only authorized retailers of specific vendors are able to list, request, buy, sell and swap products on the system. In further examples, the system controls execution so that exchanges can occur anonymously, while maintaining the assurances that transactions are facilitated by authorized parties at vendor-set prices. In yet other example, the system permits authorized retailers to list non-performing goods for authorized retailers to obtain by purchase or swap at wholesale cost. In yet other example, the system permits authorized retailers to request goods at wholesale cost and display the requests in a workflow that permits providers execute fulfillment.

20 Claims, 29 Drawing Sheets

(51) Int. Cl.
*G06Q 30/0601* (2023.01)
*G06Q 10/087* (2023.01)

(56) References Cited

U.S. PATENT DOCUMENTS

| | | | | |
|---|---|---|---|---|
| 8,078,513 | B1* | 12/2011 | Sobh | G06Q 20/10 |
| | | | | 705/37 |
| 8,099,331 | B2* | 1/2012 | Devries | G06Q 30/0601 |
| | | | | 705/37 |
| 8,266,011 | B2* | 9/2012 | Torrenegra | G06Q 30/0601 |
| | | | | 705/26.4 |
| 10,565,547 | B2* | 2/2020 | Deshpande | G06Q 10/087 |
| 11,188,960 | B2 | 11/2021 | Van der Baan et al. | |
| 2001/0034673 | A1* | 10/2001 | Yang | G06Q 10/087 |
| | | | | 703/2 |
| 2002/0002501 | A1* | 1/2002 | Reyda | G06Q 30/02 |
| | | | | 705/26.8 |
| 2002/0032643 | A1* | 3/2002 | Himmelstein | G06Q 40/04 |
| | | | | 705/37 |
| 2002/0174051 | A1* | 11/2002 | Wise | G06Q 40/04 |
| | | | | 705/37 |
| 2005/0065858 | A1* | 3/2005 | Tenzer | G06Q 30/0623 |
| | | | | 705/26.61 |
| 2006/0064409 | A1* | 3/2006 | Hardwick | G06Q 30/06 |
| 2006/0085235 | A1* | 4/2006 | Nguyen | G06Q 10/087 |
| | | | | 705/28 |
| 2006/0195563 | A1* | 8/2006 | Chapin | H04L 67/1095 |
| | | | | 709/224 |
| 2007/0124228 | A1* | 5/2007 | Elias | G06Q 40/04 |
| | | | | 705/37 |
| 2008/0027836 | A1* | 1/2008 | Chapin | G06Q 10/087 |
| | | | | 705/28 |
| 2008/0065514 | A1* | 3/2008 | Eaton | G06Q 30/02 |
| | | | | 705/27.1 |
| 2008/0314981 | A1* | 12/2008 | Eisenson | G06Q 10/0875 |
| | | | | 705/28 |
| 2009/0119223 | A1* | 5/2009 | Ourega | G06Q 30/06 |
| | | | | 705/80 |
| 2009/0271284 | A1* | 10/2009 | Arbib | G06Q 40/12 |
| | | | | 705/26.1 |
| 2010/0161597 | A1* | 6/2010 | Bocheck | G06Q 30/00 |
| | | | | 707/E17.084 |
| 2011/0196760 | A1* | 8/2011 | Howard | G06Q 30/0613 |
| | | | | 705/26.41 |
| 2011/0196797 | A1* | 8/2011 | Liwerant | G06Q 50/188 |
| | | | | 705/71 |
| 2011/0231516 | A1* | 9/2011 | Cole | G06Q 40/04 |
| | | | | 709/217 |
| 2012/0197748 | A1* | 8/2012 | Vorse | G06Q 30/08 |
| | | | | 705/26.3 |
| 2012/0278191 | A1* | 11/2012 | Aschettino | G06Q 30/06 |
| | | | | 705/26.1 |
| 2012/0296756 | A1* | 11/2012 | Shah | G06Q 30/00 |
| | | | | 705/26.2 |
| 2012/0304305 | A1* | 11/2012 | Efraimov | G06F 21/33 |
| | | | | 726/27 |
| 2013/0066753 | A1* | 3/2013 | Doyle | G06Q 30/08 |
| | | | | 705/28 |
| 2013/0282604 | A1* | 10/2013 | Shukla | G06Q 10/101 |
| | | | | 705/319 |
| 2014/0074656 | A1* | 3/2014 | Stehrenberger | G06Q 30/0619 |
| | | | | 705/26.44 |
| 2014/0215066 | A1* | 7/2014 | Kamat | H04L 63/08 |
| | | | | 709/225 |
| 2016/0034989 | A1* | 2/2016 | Kline | G06Q 50/01 |
| | | | | 705/26.2 |
| 2017/0186063 | A1* | 6/2017 | Sugaya | G06Q 30/0619 |
| 2018/0040066 | A1* | 2/2018 | Cholak | G06Q 10/087 |
| 2019/0035019 | A1* | 1/2019 | Jalali | G06Q 40/04 |
| 2019/0172121 | A1* | 6/2019 | Fleming | G06Q 30/0633 |
| 2020/0143442 | A1* | 5/2020 | Passi | H04M 15/51 |
| 2020/0294107 | A1 | 9/2020 | Van der Baan et al. | |

OTHER PUBLICATIONS

Richard Cravatts. "Barter: A Strategic Tool for the New Economy". Retrieved from <https://www.businessknowhow.com/money/barter.htm> on Dec. 11, 2020. Originally published Jan. 2014. (Year: 2014).*

Cravatts, Barter: A Strategic Tool for the New Economy. Business Know How. Jan. 2014. 2 pages. Retrieved from https://www.businessknowhow.com/money/barter.htm (Last accessed Dec. 11, 2020).

Recktenwald, Barters, swaps, and other twists on B2B e-commerce models. Tech Republic. Dec. 1999. 10 pages. Retrieved from https://www.techrepublic.com/article/barters-swaps-and-other-twists-on-b2b-e-commerce-models/ (Last accessed Dec. 11, 2020).

* cited by examiner

Exchange System 300

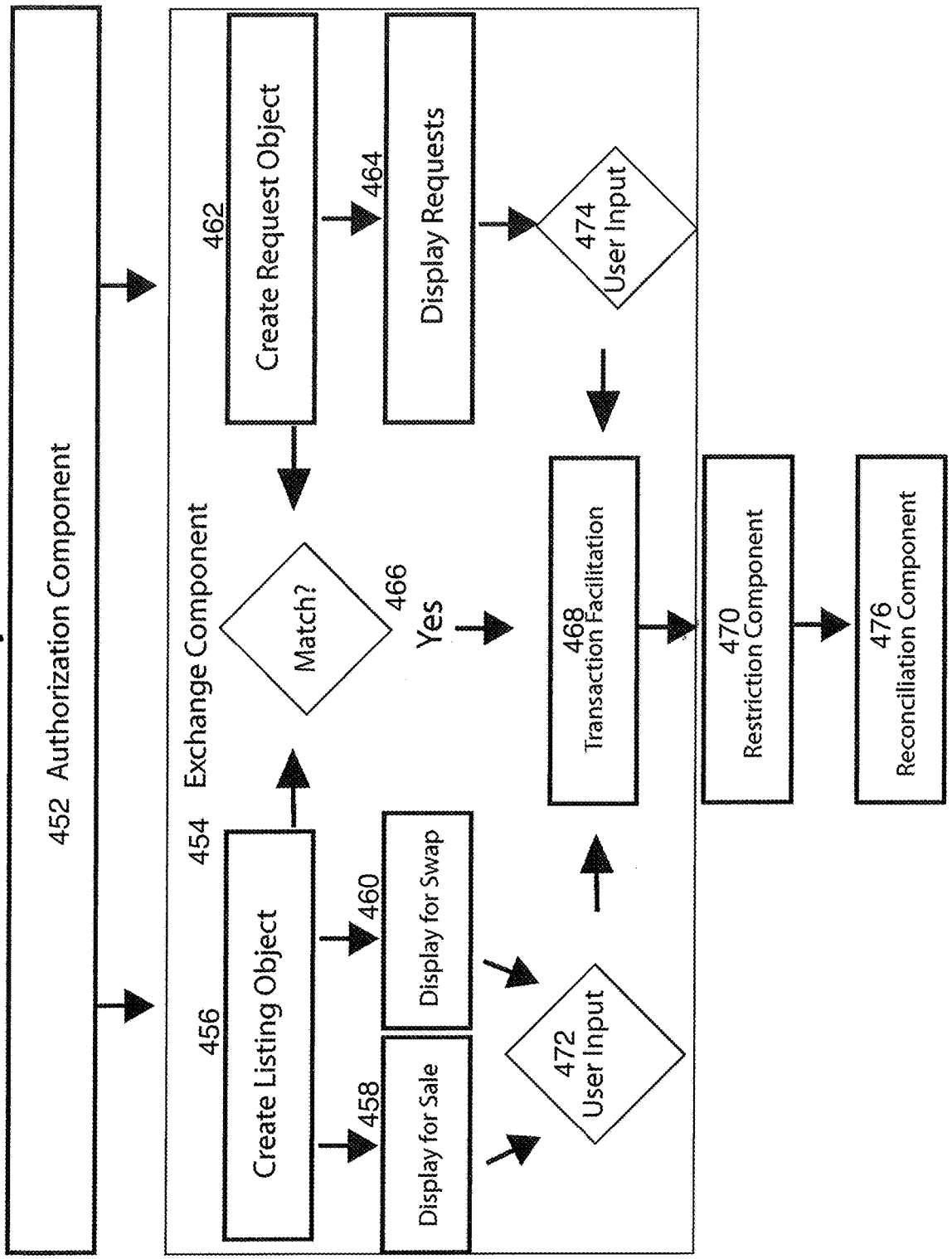
FIG 4: System 450

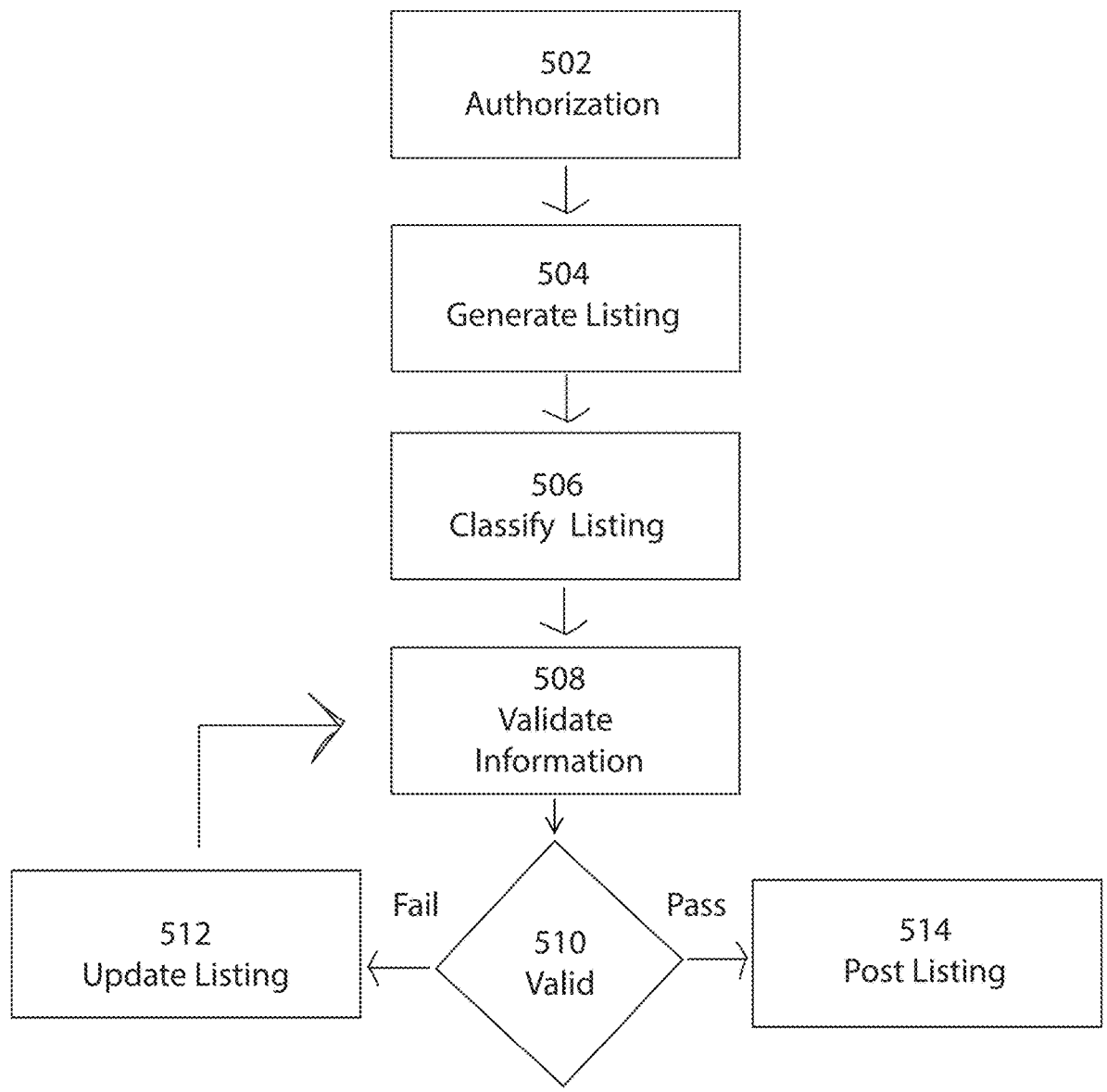

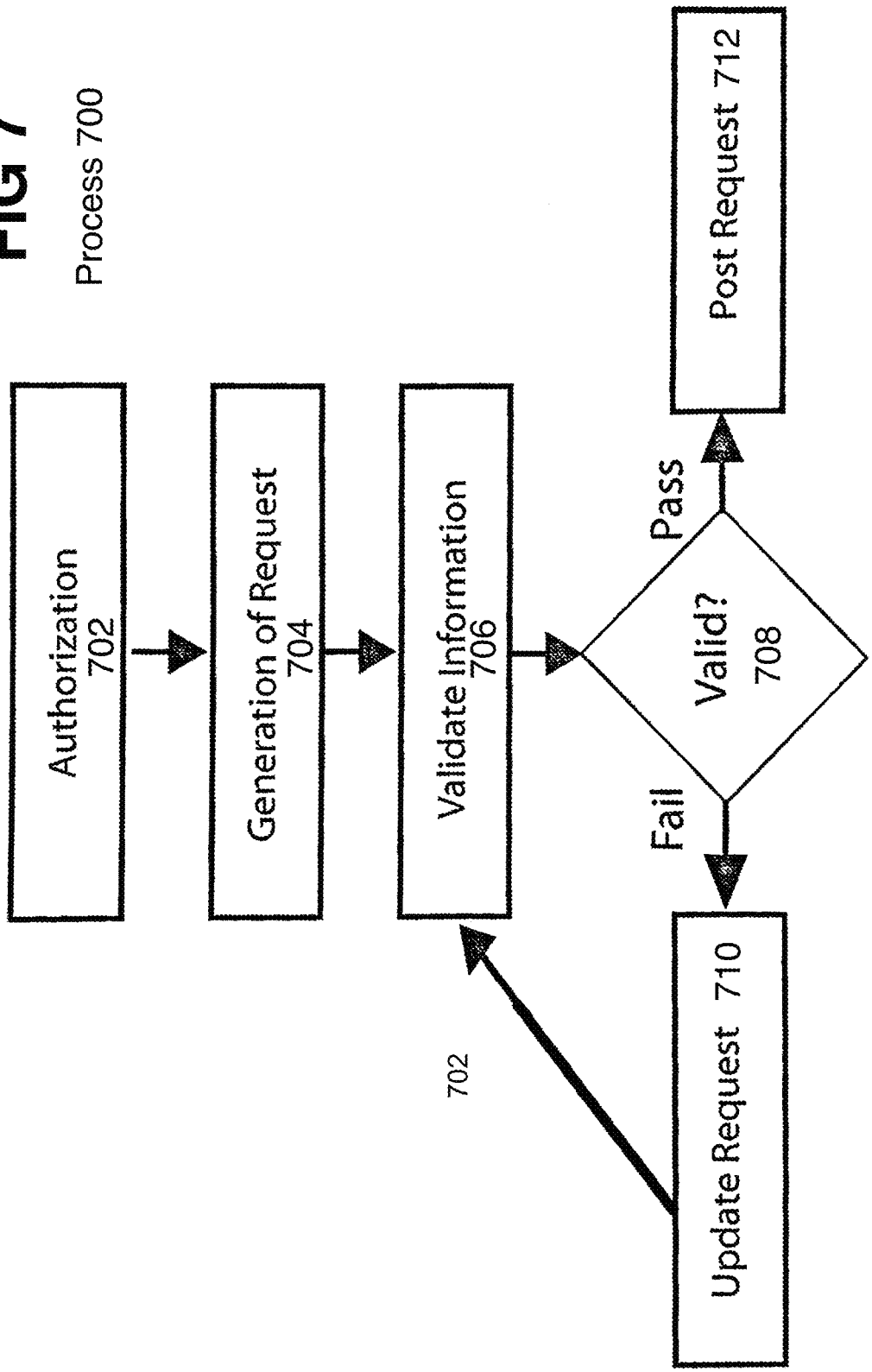

FIG 9

SWAPRETAIL

Looking for something?

washed black 9380

Collection: Spring
SKU: D227-2
Name: Go Gypsy Redux Dress
Color: Washed Black
Description: Go Gypsy Redux Dress
Other: Composition: Washed Silk Fuji
Cost: $150.00

Select the sizes you have

XS   1
S   1
M   0
L   0
XL   0

Total Units   2
Total Value   $300.00

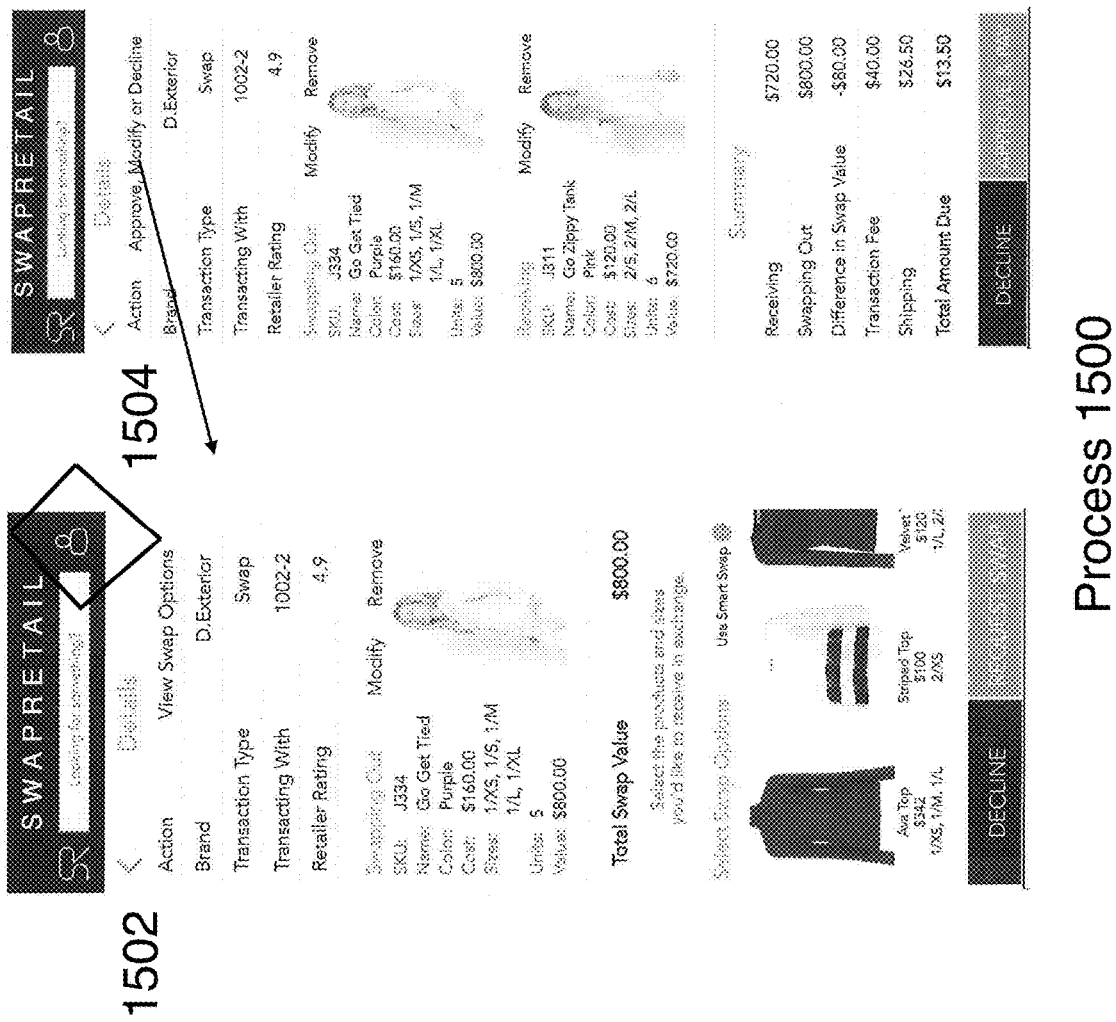

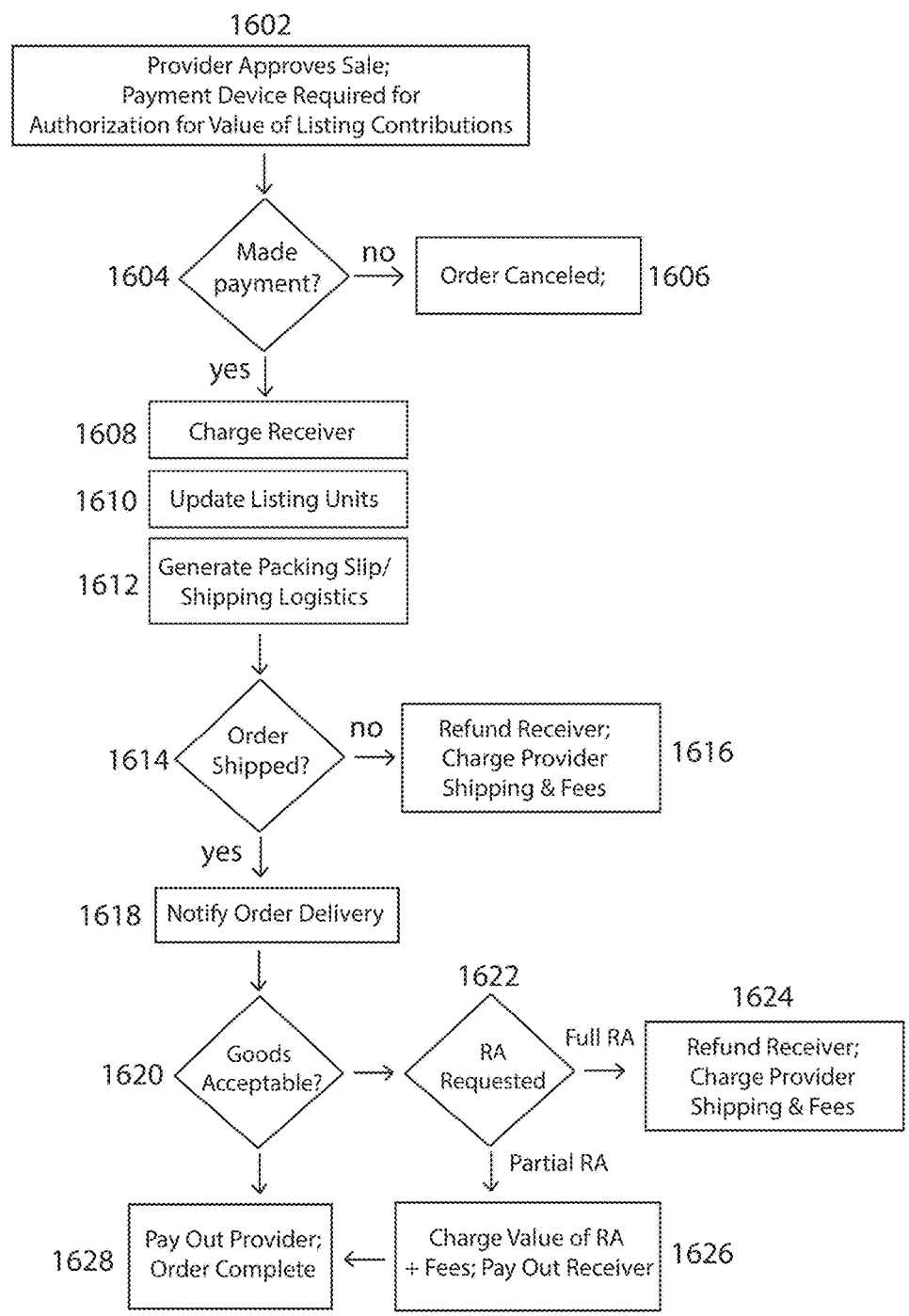

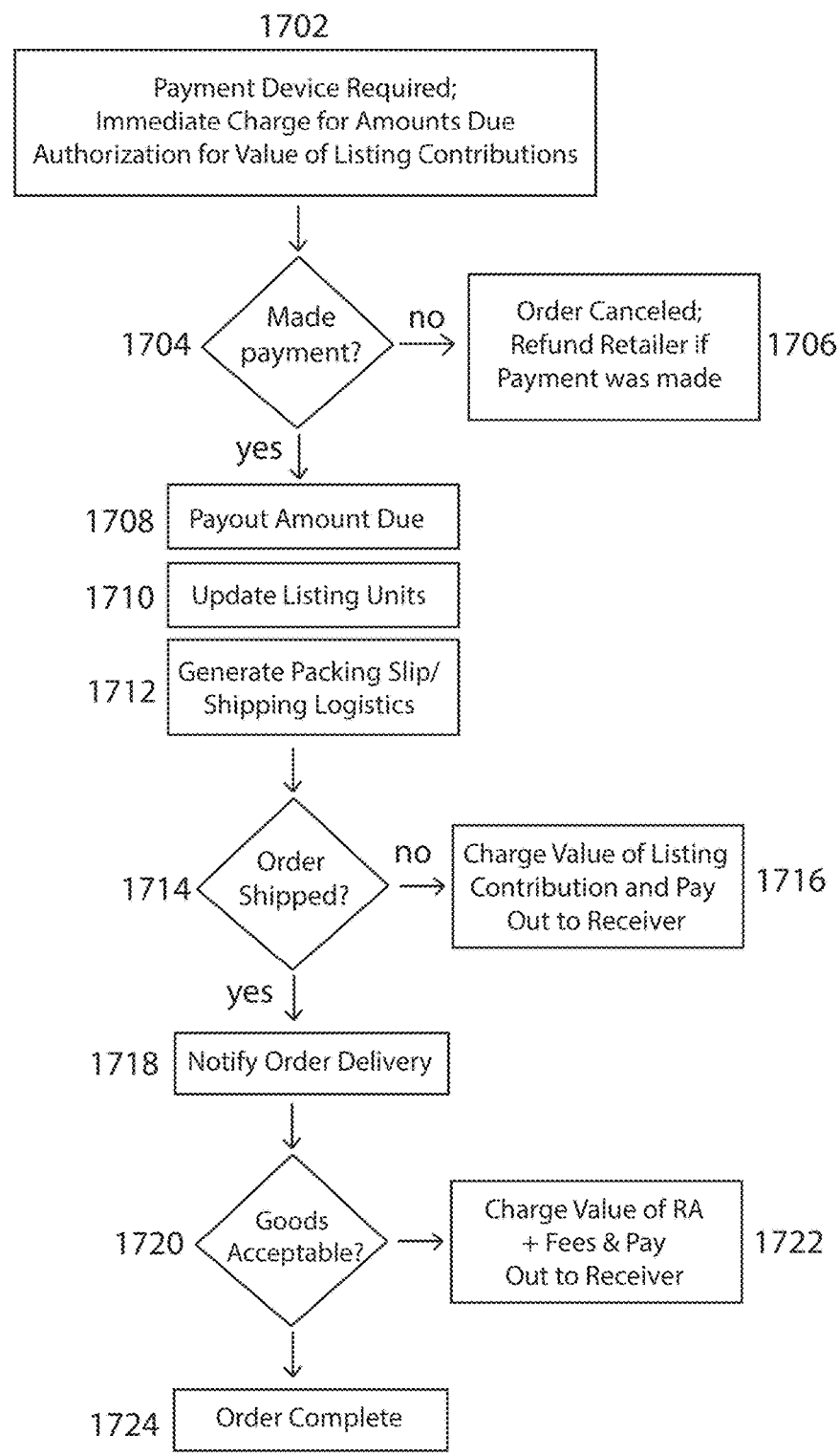

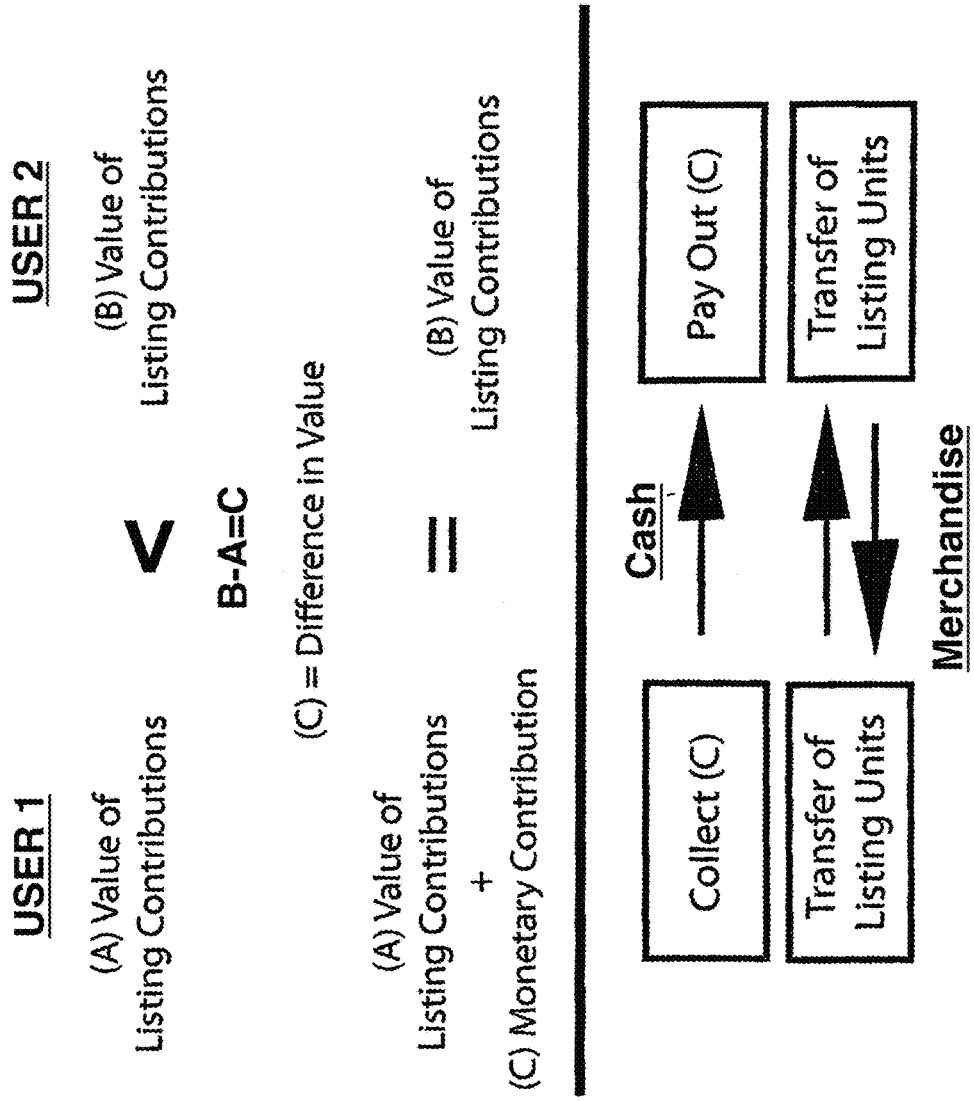

FIG 19

Sample Code

{id: 144, display_name: "BuyTransaction object (144)", provider: 1, receiver: 26,...}
display_name: "BuyTransaction object (144)"
id: 144
provider: 1
provider_call_it_even: false
provider_contributions: [{id: 416, listing_id: 61, product: {id: 346, display_name: "Go Lace Up Dress",...}, units: {XS: 1},...}]
0: {id: 416, listing_id: 61, product: {id: 346, display_name: "Go Lace Up Dress",...}, units: {XS: 1},...}
provider_fee: "0.00"
provider_shipping: "0.00"
receiver: 26
receiver_call_it_even: false
receiver_contributions: [{id: 417, value: 130, type: "cash"}]
0: {id: 417, value: 130, type: "cash"}
receiver_fee: "13.00"
receiver_grand_total: 162.75
receiver_shipping: "19.75"
total_provider_value: 130
total_receiver_value: 0

FIG 20

Sample Code

```
{id: 143, display_name: "SwapTransaction object (143)", provider: 26, receiver: 1,...}
display_name: "SwapTransaction object (143)"
id: 143
is_modified: false
provider: 26
provider_call_it_even: false
provider_contributions: [...]
  0: {id: 413, listing_id: 66, product: {id: 354, display_name: "Go On Safari Vest",...}, units: {XL: 1},...}
    id: 413
    listing_id: 66
    product: {id: 354, display_name: "Go On Safari Vest",...}
    type: "items"
    units: {XL: 1}
    value: 170
  1: {id: 412, listing_id: 66, product: {id: 354, display_name: "Go On Safari Vest",...}, units: {L: 1},...}
    id: 412
    listing_id: 66
    product: {id: 354, display_name: "Go On Safari Vest",...}
    type: "items"
    units: {L: 1}
    value: 170
  2: {id: 411, listing_id: 66, product: {id: 354, display_name: "Go On Safari Vest",...}, units: {M: 1},...}
    id: 411
    listing_id: 66
    product: {id: 354, display_name: "Go On Safari Vest",...}
    type: "items"
    units: {M: 1}
    value: 170
  3: {id: 410, listing_id: 66, product: {id: 354, display_name: "Go On Safari Vest",...}, units: {S: 1},...}
    id: 410
    listing_id: 66
    product: {id: 354, display_name: "Go On Safari Vest",...}
    type: "items"
    units: {S: 1}
    value: 170
  4: {id: 409, listing_id: 66, product: {id: 354, display_name: "Go On Safari Vest",...}, units: {XS: 1},...}
    id: 409
    listing_id: 66
    product: {id: 354, display_name: "Go On Safari Vest",...}
    type: "items"
    units: {XS: 1}
    value: 170
provider_fee: "42.50"
provider_shipping: "27.75"
receiver: 1
receiver_call_it_even: false
receiver_contributions: [{id: 415, value: 50, type: "cash"},...]
  0: {id: 415, value: 50, type: "cash"}
    id: 415
    type: "cash"
    value: 50
  1: {id: 414, listing_id: 65, product: {id: 339, display_name: "Go Fray Around The Edges Dress",...},...}
    id: 414
    listing_id: 65
    product: {id: 339, display_name: "Go Fray Around The Edges Dress",...}
    type: "items"
    units: {M: 5}
    value: 800
receiver_fee: "40.00"
receiver_shipping: "27.75"
total_provider_value: 850
total_receiver_value: 800
```

FIG 21

Sample Code

```
if self.provider_call_it_even or self.receiver_call_it_even:
    # take the bigger of the two contribution values
    val = max(partyval, nonpartyval)
    return (val, val)
else:
    # return each contributor's actual values
    return (
       partyval,
       nonpartyval
    )

def setup_cash_contributions(self):
    receiver_value, provider_value = self._participant_contribution_value(
       self.receiver
    )
    if receiver_value > provider_value and not self.receiver_call_it_even:
      TransactionContribution.objects.create(
         transaction=self,
         provider=self.provider,
         value = receiver_value - provider_value,
      )
    if receiver_value < provider_value and not self.provider_call_it_even:
      TransactionContribution.objects.create(
         transaction=self,
         provider=self.receiver,
         value = provider_value - receiver_value,
      )
```

FIG 22
Call It Even

SWAPRETAIL

Looking for something?

< Details

| | |
|---|---|
| Action | Approve or Decline |
| Brand | D.Exterior |
| Transaction Type | Swap |
| Transacting With | 1002-2 |
| Retailer Rating | 4.9 |

Swapping Out          Modify    Remove
SKU:   J334
Name:  Go Get Tied
Color: Purple
Cost:  $160.00
Sizes: 1/XS, 1/S, 1/M
       1/L, 1/XL
Units: 5
Value: $800.00

Receiving             Modify    Remove
SKU:   J311
Name:  Go Zippy Tank
Color: Pink
Cost:  $120.00
Sizes: 2/S, 2/M, 2/L
Units: 6
Value: $720.00

Summary

| | |
|---|---|
| Receiving | $800.00 |
| Swapping Out | $800.00 |
| Difference in Swap Value | $0.00 |
| Transaction Fee | $40.00 |
| Shipping | $26.50 |
| Total Amount Due | $13.50 |

DECLINE CALL IT EVEN

Listings & Requests    Alerts    Orders    Favorites    Settings

SYSTEMS AND METHODS FOR MANAGING DIRECT EXCHANGE

CROSS REFERENCE TO RELATED APPLICATIONS

This application is a continuation claiming the benefit of U.S. application Ser. No. 16/355,500, filed Mar. 15, 2019, and entitled "SYSTEMS AND METHODS FOR MANAGING DIRECT EXCHANGE", which is hereby incorporated herein by reference in its entirety.

BACKGROUND

In retail, product has a shelf life. Inventory that does not sell ends up returned to the vendor, marked down, consigned, donated or thrown away. Vendors need their products to have a strong sell-through within retail stores or they lose business. Another aspect of retail is buying additional product; if a retailer needs to reorder a product and the vendor does not have it available, both lose a sale. A creative solution for moving stale products and fulfilling reorders is to buy, sell or swap the products with other retailers; which will be referred to as retailer-to-retailer transactions ("R2R").

SUMMARY

The inventors have realized that one issue with R2R for vendors is that they do not want their product to be exchanged by unauthorized retailers at ambiguous prices. According to one aspect, the system provides an automated platform for facilitating and managing R2R, that preserves control of the exchanges with the provider. For example, according to one embodiment of the system, only authorized retailers of specific vendors are able to list, request, buy, sell and swap products on the system. In further examples, the system controls execution so that exchange can occur anonymously, while maintaining the assurances of user approval and proper reconciliation of payments and delivery. In yet another example, the system permits authorized retailers to obtain goods from other authorized retailers at wholesale cost for which they are approved.

One conventional solution for managing non-performing product is provide for the exchange of product between retailers who are familiar with each other. These manual R2R transactions (e.g., direct vendor to vendor transactions) fail to provide assurance of correct, undamaged, and delivered products. In addition, offerings are limited and the exchange process is inconsistent. One conventional solution for non-performing product is the exchange of product between retailers and vendors (R2V) via return authorizations. However, these conventional exchanges suffer from many flaws, including, for example, a lack of inventory that vendors (e.g., who produce goods strictly "to order") can exchange. The lack of inventory of these vendors prevents participation and/or adoption of these conventional approaches. Various conventional R2V approaches suffer from many inefficiencies (e.g., within the vendor's sales, accounting and shipping departments that complicate execution and hamper adoption). In other examples, vendors who have available merchandise to offer retailers in need of an exchange dislike this conventional solution due to the complexity and increased workload it causes their internal staff.

Various embodiments of the system resolve these issues and provide, for example, for exchanges of goods to occur through an automated, regulated system for R2R, without brand involvement. Further embodiments of the system enable vendors to more efficiently manage their time and resources without losing control over distribution and assure that action taken by their retailers with unsold products on the system complies with the wholesale vendor requirements. In further embodiments, this operation can be executed, in some examples, without brand involvement (e.g., beyond establishing restrictions).

According to some embodiments, the system is configured to enable wholesale vendors (e.g., affiliated with a SwapRetail site, the system or the platform) to provide their list of authorized retailer contacts, product catalogs, images and wholesale price lists. The system accepts information from the wholesale vendor via custom user interfaces. According to various embodiments, the system can enable rigid control definition by the wholesale vendor that is automatically enforced by system throughout execution. According to various embodiments, the system is configured to maintain tight control over transactions that occur in regards to the authorized retailers, authentic products and accurate pricing of each vendor. The system can also be configured to execute a variety of enforcement processes to maintain compliance.

According to various embodiments, the system is configured to manage inventory exchanges, for example, when an authorized retailer (e.g., a provider) accesses the platform and creates a listing object or a request object, the system can be configured to generate listing information according to the data the vendor provided. Further, the system facilitates demand generation, responsive to an authorized retailer (receiver) creating a request. In further examples, the system is configured to manage restrictions (e.g., only authorized retailers permitted to view and create listings or requests) through a specially configured user interface and/or controls. In some examples, the system is configured to manage actual exchange responsive to determining a match between a listing and a request, and in further examples, responsive to determining that a provider or receiver is executing a direct purchase, sale or negotiating a swap of products.

In some embodiments, the system is configured to manage reconciliation and execution of orders (e.g., via building and executing order objects) responsive to determining that the provider and receiver are in agreement and approve the exchange. According to one embodiment, the execution of an order (reconciliation) can include a series of automated events (e.g., payments, packing slips, call tags and shipping) that results in the transfer of products from one retailer to another.

According to one aspect, an exchange system is provided. The system comprise at least one processor operatively connected to a memory; an authorization component, executed by the at least one processor, configured to: accept definition of authorization objects, the authorization object including an association linking one or more users and a data element specifying an authorization attribute (e.g., brand or vendor variable); a restriction component, executed by the at least one processor, configured to: determine privileges for authenticated users of the system to access listing or request objects stored on the system; and limit access to the listing or request objects to users with privileges based on analysis of the authorization objects and defined association; an exchange component configured to enable users to: generate listing or request objects specifying a specifying a one or more listing items for exchange with at least one other authorized user; enable users to define the listing or the request objects for execution on the system, wherein the exchange component requires specification of a product object stored in a product database in order to generate the listing or the request object without custom processing; and a reconciliation component configured to manage execution of the exchange described in the listing or request object.

According to one embodiment, the exchange component is further configured to: enable a first user to define a first listing object comprising one or more listing items; enable the first user to specify a first listing object of a second user and request the second user accept a direct exchange incorporating at least the first listing object of the second user and the first listing object of the first user. According to one embodiment, the exchange component is further configured to: enable a first user to create a listing object comprising one or more listing units; enable the first user to specify one or more listing objects of a second user and initiate an exchange request.

According to one embodiment, the exchange component is further configured to: display the first user's listing objects classified for exchange to the second user, and enable the second user to specify one or more listing objects of the first user; manage and visualize exchange details between the users in the exchange request; enable users to modify the listing objects specified and submit for approval with the other user; enable users in a pending exchange to approve exchange transactions, triggering reconciliation; enable users in a pending exchange to decline exchange transactions, ending correspondence.

According to one embodiment, the system is further configured to enable listing units to be requested in recursive exchange requests until one is approved. According to one embodiment, the system is further configured to: generate and display listing objects specifying one or more listing units for sale or exchange with authorized users; and generate and display request objects specifying one or more request units to authorized users.

According to one embodiment, the exchange component is configured to: determine any difference between the listing contributions of the first user and the listing contributions of the second user; and generate an operation for reconciling the difference. According to one embodiment, the exchange component is configured to: determine any difference between the first listing object of the first user and the second listing object of the second user; and generate responsive to first user input a request to accept the difference for display to the second user.

According to one embodiment, the exchange component is configured to: determine any difference between the listing contributions of the first user and the listing contributions of the second user; and incorporate a request to a respective user to accept the determined difference. According to one embodiment, the authorization component is configured to enable third parties, not participating in a product purchase or exchange, to define exchange restrictions on goods sourced from or managed by the third party.

According to one embodiment, the authorization component is configured to enable authorized vendors or brand managers to access the system to define the authorization objects. According to one embodiment, the authorization component is configured to enable authorized vendors or brand managers to access the system to define the product objects. According to one embodiment, the authorization component is configured to enable authorized vendors or brand managers to access the system to define restrictions on execution. According to one embodiment, the system is further configured to: accept and display a request object with internal unspecified information, where specified information of the request object is determined valid, and unspecified information is not subject to restriction requirements.

According to one embodiment, the exchange component is configured to: accept and display specific request objects of users validated by the authorization and restriction components, including at least one request object with unspecified information. According to one embodiment, the exchange component is further configured to: analyze existing objects against newly created objects to determine matches between user defined objects; and initiate a pending exchange between users for matches dynamically associated between listing and request objects.

According to one embodiment, the exchange component is further configured to enable fulfillment of request objects through automatic approval of dynamically associate matches between listing and request objects.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE FIGURES

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 4 is a block diagram of the workflow of an example exchange system, according to one embodiment;

FIG. 5 is an example process flow for generating a listing object, according to one embodiment;

FIG. 7 is an example process flow for generating a request object, according to one embodiment;

FIG. 9 is an example screen capture of a requests directory, according to one embodiment;

FIG. 15 shows two example screen captures for users viewing exchange requests, according to one embodiment; and FIG. 16 is an example process of the reconciliation workflow for purchase/sale transactions, according to one embodiment;

FIG. 17 is an example process of the reconciliation workflow for swap transactions, according to one embodiment;

FIG. 18 Is an example formula for the reconciliation component for swaps;

FIG. 19 is the sample code for the reconciliation component in a purchase transaction;

FIG. 20 is the sample code for the reconciliation component in a swap transaction;

FIG. 21 is the sample code of the "Call it Even," according to one embodiment;

FIG. 22 is an example screen capture of a "Call It Even" request in a pending swap transaction.

DETAILED DESCRIPTION

Figure 1:
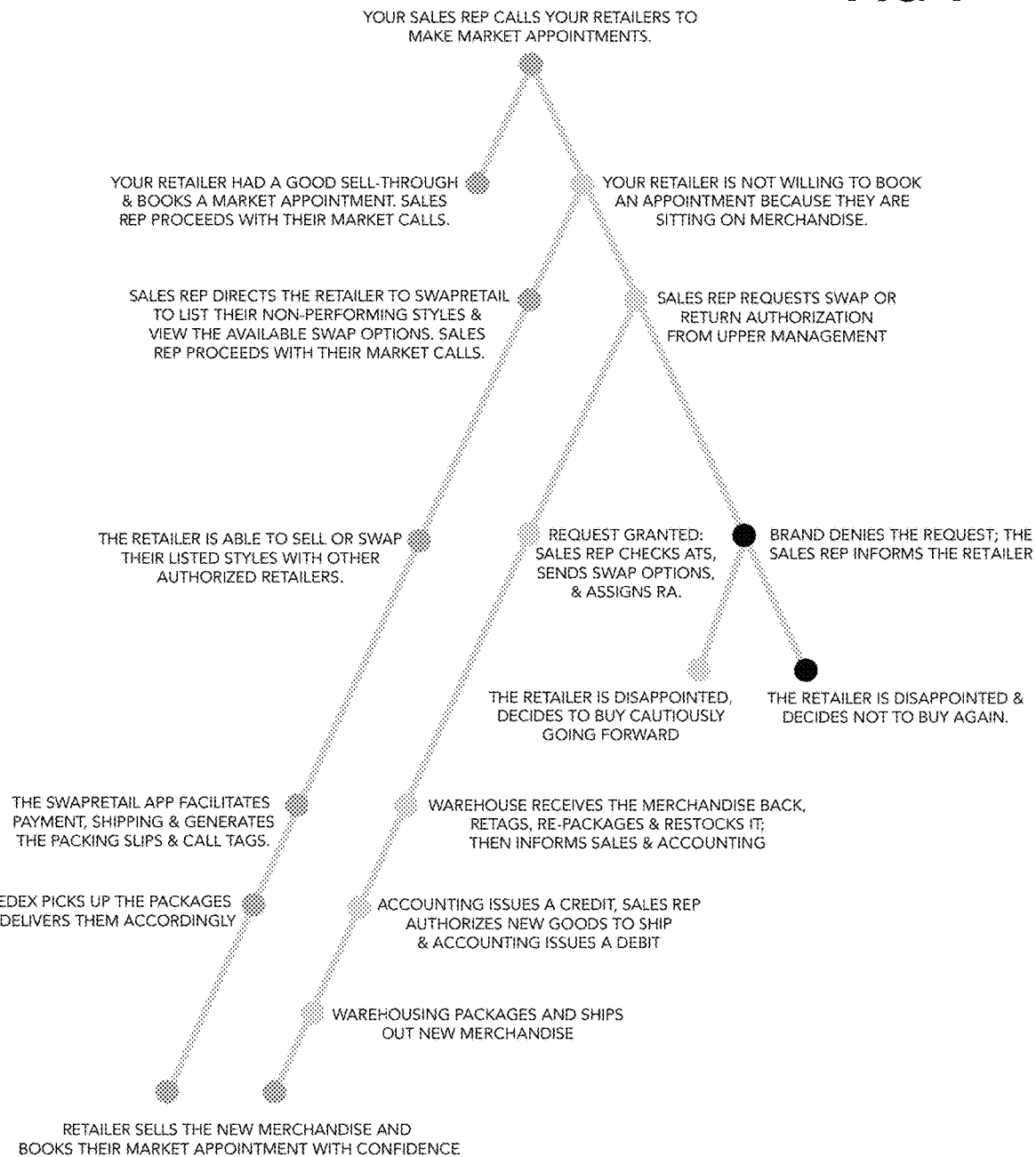
FIG. 1 is a logic flow identifying a variety of issues that can be encountered in conventional R2V approaches and how the system provides a more efficient solution, according to one embodiment.

According to some aspects, exchanges of product between retailers and vendors (R2V) create inefficiencies, for example, within the vendor's sales, accounting and shipping departments. FIG. 1 illustrates a variety of issues that can be encountered in this conventional approach, that are overcome in various embodiments of the system and/or method. Moreover, conventional approaches for retailer to retailer (R2R) exchanges fail to maintain control with the originating party (supplier of goods), and fail to enforce restrictions automatically across downstream activity (e.g., with swaps). Therefore, the inventors have realized that a need exists for a system that can manage and execute retailer to retailer exchanges with assurance that such operations comply with any vendor requirements. In other embodiments, the system enables retailers to more efficiently manage their non-performing inventory and enables wholesale vendors to more efficiently manage their time without losing control over distribution, pricing and/or other brand requirements.

In various aspects and embodiments, the system resolves issues with conventional approaches including issues for retailer to retailer exchange, where there is:

Lack of network (e.g., not knowing other retailers are willing to exchange inventory);

Lack of communication (e.g., as various retailers simply have no knowledge of each other);

Lack of visibility (e.g., not knowing what stale inventory those retailers have in-store); and Liability (e.g., no guarantee of the delivery or condition of the products, among other issues).

Figure 2:
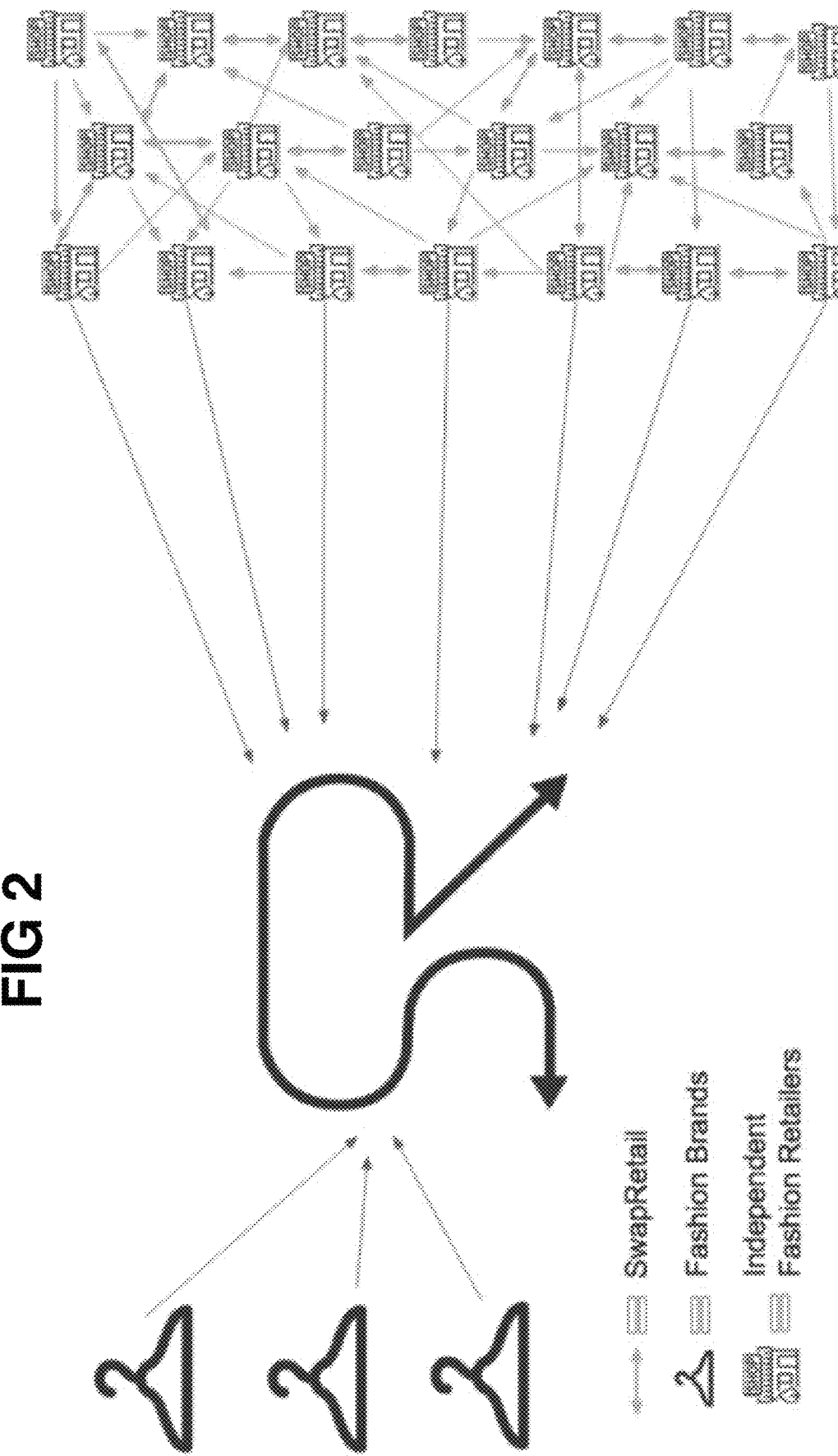
FIG. 2 is a block diagram of a connection network managed by the system, according to various embodiments.

FIG. 2 shows an example architecture and relationships between the system, brands, and retailers. In various embodiments, an exchange system can include an authorization component configured to enable users (e.g., vendors) to provide authorization parameters and/or restriction and enables users to define custom data objects with the system reflecting the same. Further embodiments, includes downstream operations executed by the system with retailers utilizing said objects through the system in order to transact with other authorized retailers According to one aspect, the system and/or platform is configured to bridge gaps between the various entities, vet the participants on the system, and provide rigid control coupled with monitoring and enforcement which can occur automatically.

In some examples, the system is executed as an intermediary between various retailers, wholesalers, and/or brands. According to one embodiment, the system provides an automated platform for managing R2R that preserves control over the exchange of merchandise. According to one embodiment of the system, only authorized retailers (users) of the affiliated vendors are able to obtain goods at wholesale cost from other authorized users for which they are approved.

FIG. 2 describes a connection network managed by the system. In various embodiments, the system can include an authorization component that is used by the vendors providing authorization and data objects to the system, and the retailers utilizing said objects through the system in order to transact with other authorized retailers. Brands (shown as hangers) provide the information of the authorized retailers and the product data to SwapRetail (SR), then retailers (shown as shops) access SwapRetail (SR) to transact safely with each other.

Figure 3:
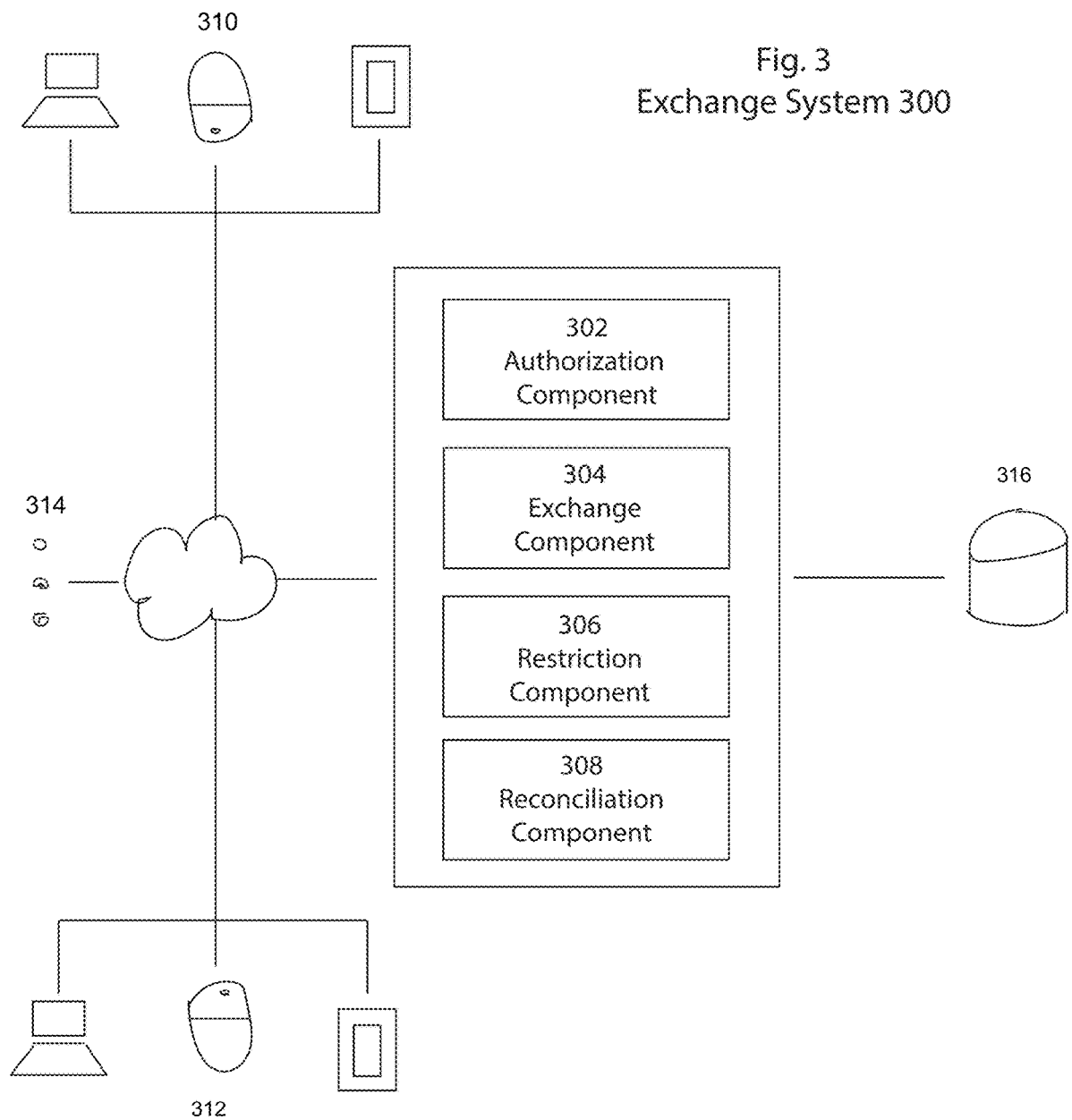
FIG. 3 is a block diagram of an example exchange system, according to one embodiment.
Figure 6A:
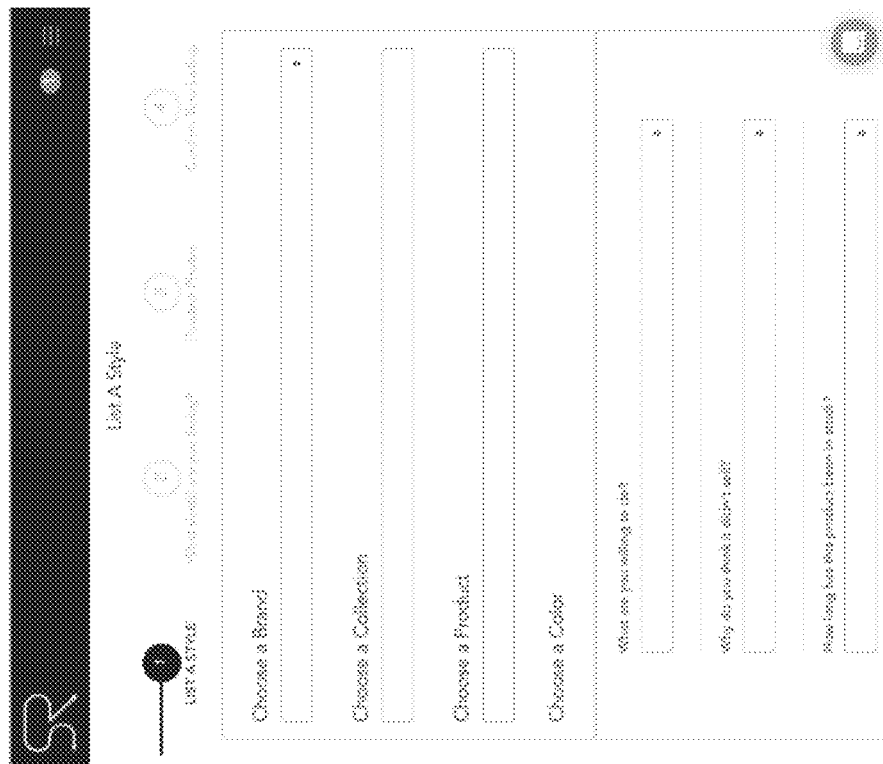
FIG. 6A-D is an example screen capture of a user interface for building a listing object, according to one embodiment.
Figure 6B:
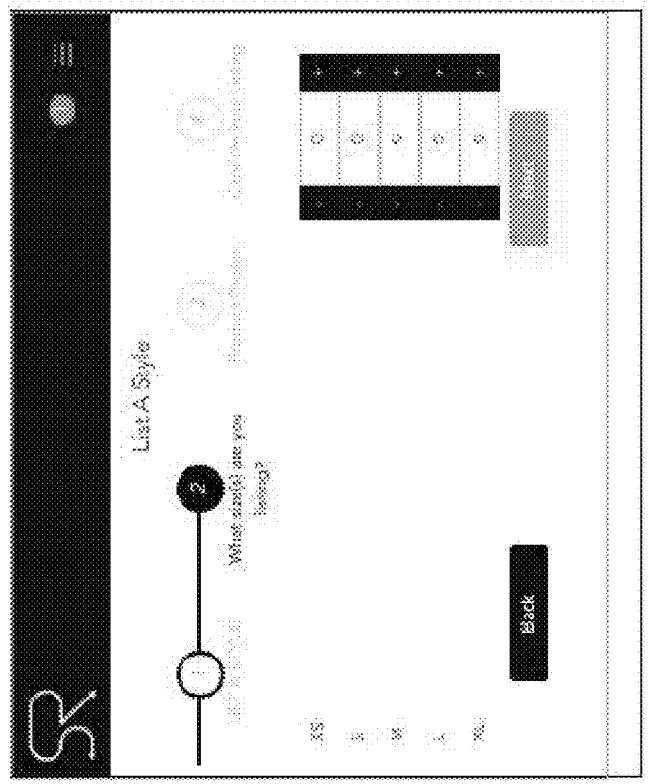
Figure 6C:
Figure 6D:
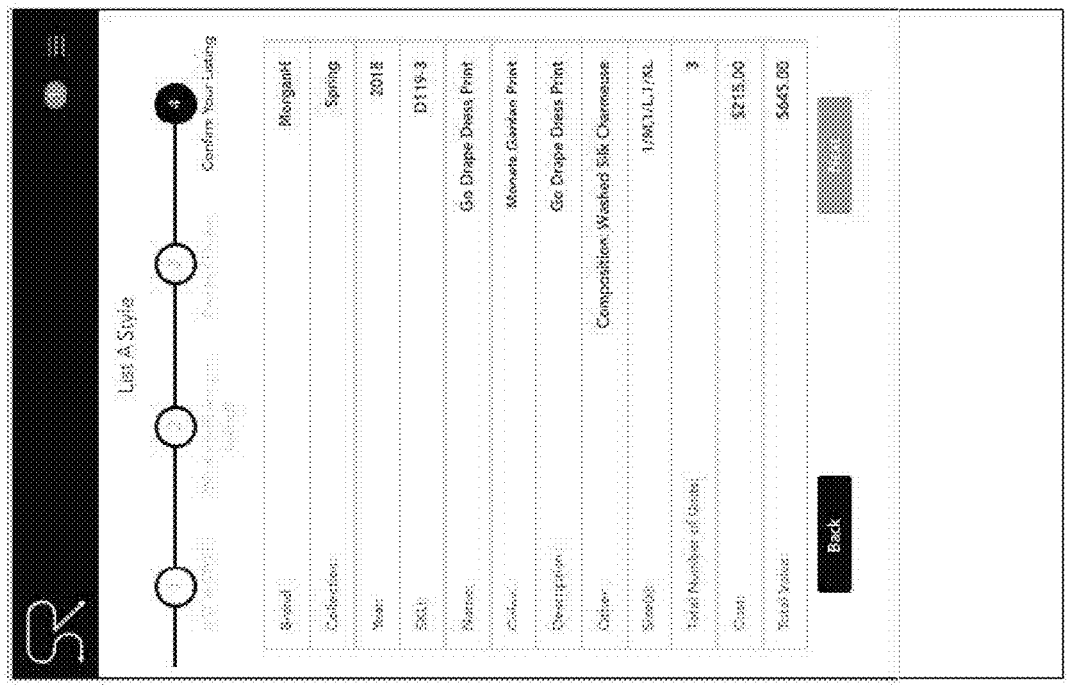
Figure 8A:
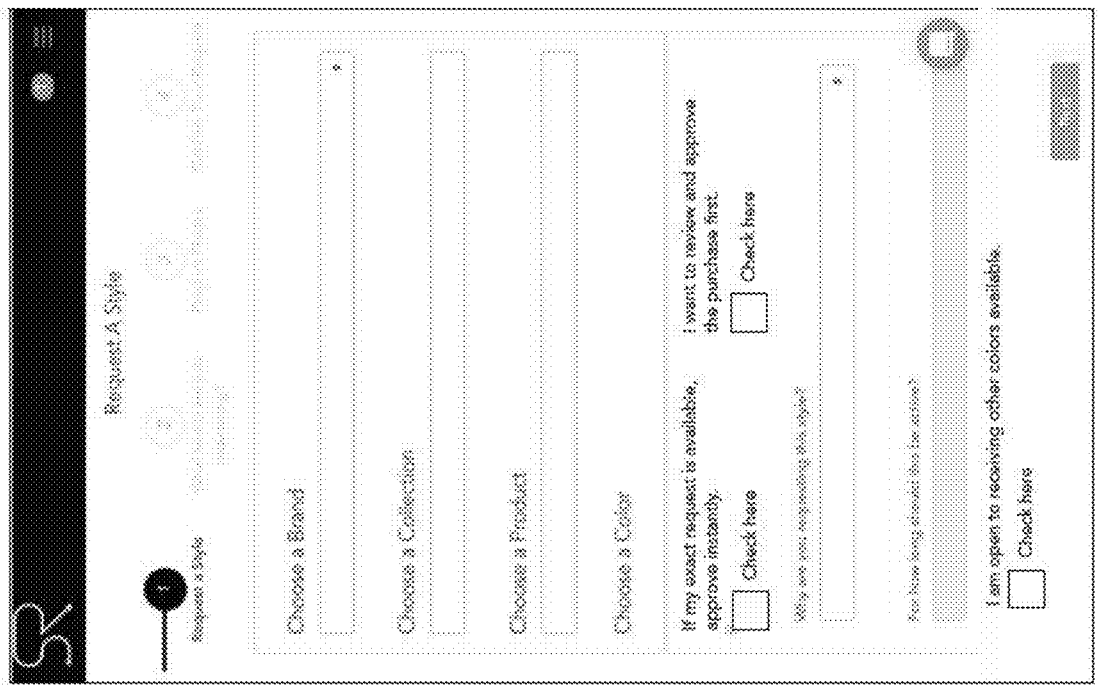
FIG. 8A-D is an example screen capture of a user interface for building a request object, according to one embodiment.
Figure 8B:
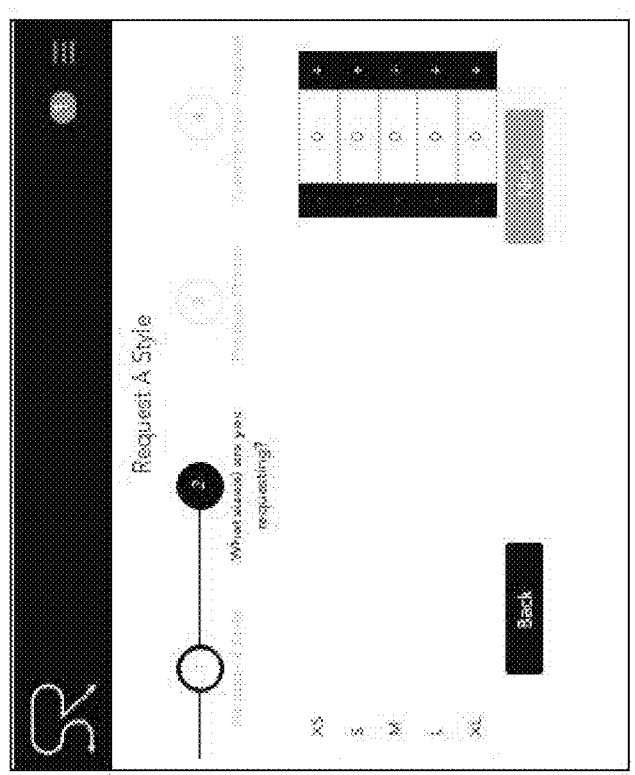
Figure 8C:
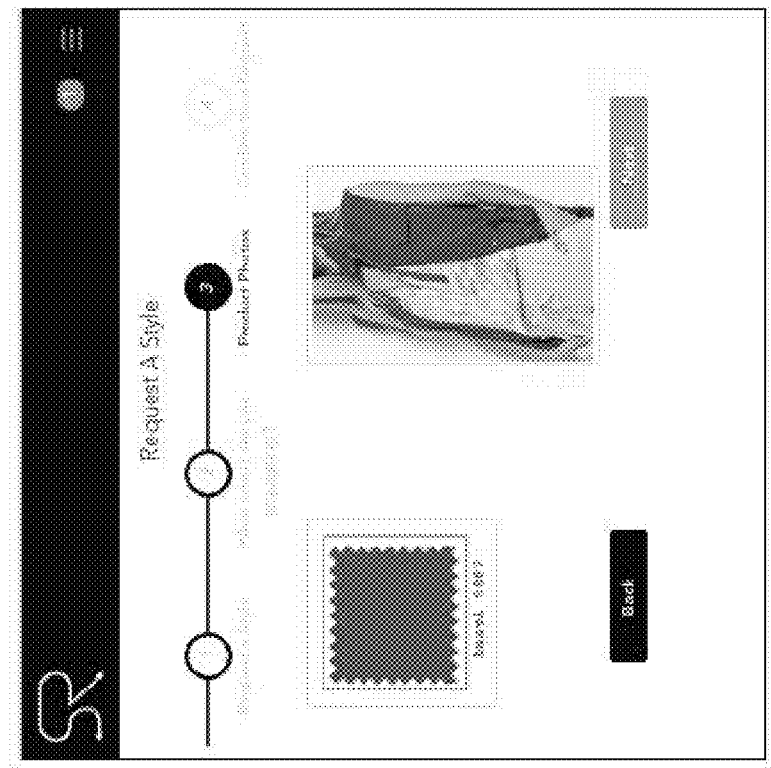
Figure 8D:
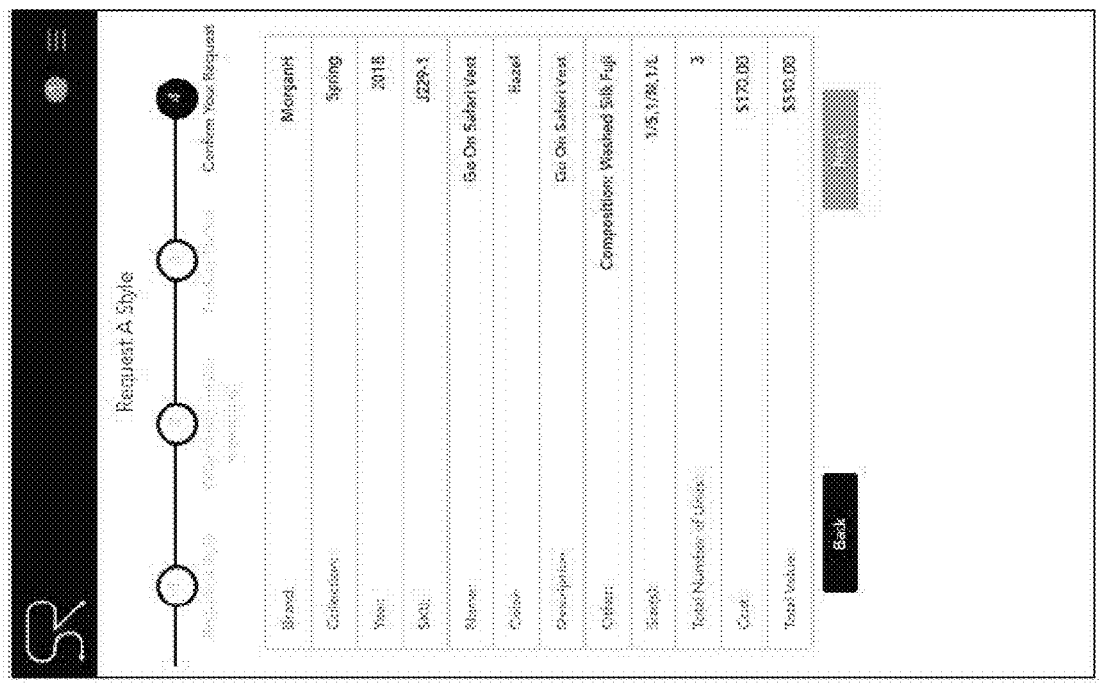

FIG. 3 is a block diagram of an example exchange system or platform 300. The exchange system can include a plurality of components, each having a set of specialized functions and operations that can be executed as part of the system 300. In other embodiments, the system 300 can execute the functionality or operations discussed herein without instantiating the separate components.

According to one embodiment, system 300 includes an authorization component 302. The authorization component can be configured to manage user authorization and validation. For example, the authorization component 302 can be configured to manage which users are allowed to register on the platform (e.g., via user devices at 310, 312, or 314). Managing registration can include, determining the user has received a valid invitation (e.g., matches an existing invitation record, is a valid merchant (e.g., has a verifiable store location and/or website), has not violated restrictions on sales in prior operations, etc.). The authorization component can also be configured to accept referrals from already authorized users to trigger communication of an invitation to register. In some embodiments, the authorization component is configured to determine if a user wishing to register meets a credit certification or credit check.

According to another embodiment, brand representatives or brand managers can also register on the system. The brand manager is validated against information known on the brand—and in some examples, the system can trigger human-based validation for brand managers as well. In further embodiments, the system is configured to capture information on brand operation and/or limitation. For example, the system can capture online information on vendor requirements/restriction. In another example, authorized and registered users can enter information on brand restriction, which can be translated into system executable rules (e.g., generated and/or maintained by a restriction component discussed in greater detail below).

According to one embodiment, system 300 includes an exchange component 304. The exchange component can be configured to enable generation of listing objects (e.g., goods for sale or exchange; brand, product detail, value, quantity, etc.), to enable generation of request objects (e.g., goods requested for purchase; brand, product detail, value, etc.), to index and display visualizations of listings and requests objects to end users and to facilitate and manage exchange requests between users; control exchange according to any restrictions; and/or display visualizations and assurance of compliance.

FIG. 4 is a block diagram of another embodiment of an exchange system or platform (e.g., 450). FIG. 4 illustrates additional detail for an example the exchange system or platform 450, which can include an authorization component (e.g., 452) configured with similar functionality and an exchange component (e.g., 454), which is described with additional details that can be present in various embodiments (including for example, 300 FIG. 3). Various implementations can include the additional elements shown or execute the described functions described with respect to a more general exchange component (e.g., 304 FIG. 3).

In further embodiments, the system indexes listing objects within a "Buy" directory for authorized users to view and initiate a purchase transaction request. In another embodiment, the system indexes request objects within a "Swap" directory for authorized users to view and initiate a swap transaction request. In another embodiment, the system facilitates demand generation, responsive to an authorized user creating a request object (e.g., need for a product). In another embodiment, the system indexes request objects within a "Sell" directory for authorized users to view and notify if they can fulfill it.

According to various embodiments, the exchange component 304, FIG. 3 (or e.g., 454) can be configured to: execute listing entry functions, display and search available listings, validate users for access rights (e.g., viewing of listing) and/or operational rights (e.g., participate in swap or purchase), among other options. In some settings, listings may specify specific vendors or groups of authorized vendors, and only authorized users can act on or view such listings. This functionality can also be employed by brand managers or be based on specific brand rules. For example, brand managers may require permission to sell or exchange a specific branded good by creating entries that the system enforces during operation.

The exchange component 304 can be configured to execute "request entry" functions, display and search active requests, validate users for access rights (e.g., viewing of request), validate of operational rights (e.g., ability for a user to offer to sell the requested item), among other options. In some settings, requests may specify limitations associated with specific vendors or groups of authorized vendors, and only authorized users can act on or view such requests based on the system enforcing the specified limitations.

In various embodiments, the system can manage request objects and listing objects, where in some examples the request objects are configured to be "open-ended" (e.g., made without a product code or variant selected). According to one example, a request object can be generated for a particular brand, any product in the category of dresses, any color, in size XL. In other embodiments, the system generates listing objects with additional constraints and the listing objects are analyzed and required to comply with the restriction requirements of listing product code, color, variant, price, quantities, etc.

The exchange component (e.g., 304, 454, etc.) can be configured to display listing objects (e.g., classified for sale 458, classified for swap 460). The system allows end-users to browse the listings in the respective directories and input the sizes they want to initiate a transaction request as well as create listing objects (e.g., at 456). In one aspect, a user can choose the classification as "both" in which case the listing object will be shown in both directories. The exchange component (e.g., 304, 454, etc.) can be configured to allow user to create request objects (e.g., 462), and/or display existing or just created request objects (e.g., at 464). According to various embodiments, the system allows end-users to browse the requests in the respective directories, input the product code, variant (if not specified) and sizes they have available to initiate a transaction request. According to one embodiment, the various data object may be store in database 316.

According to another embodiment, the exchange component 304 can operate in conjunction with a restriction component 306 to ensure any applicable restrictions or limitations are being honored. In one example, the restriction component executes search and/or matching between permissions files which can be part of created objects and/or can be maintained separately for permission reconciliation.

According to one embodiment, the exchange component (e.g., FIG. 3; 304, FIG. 4; 454) can be configured to match new listing objects with active requests and to match new request objects with active listing objects (e.g., at 466 YES) and initiate a transaction between the provider and receiver (e.g., 468) (e.g., when a match is determined 466 YES (e.g., along with appropriate permissions for each brand item and user). In some embodiments, users can connect a payment device to their request object and pre-approve a listing object that is an exact match, in which case the system can trigger automatic approval and reconciliation.

The exchange component (e.g., FIG. 3; 304, FIG. 4; 454) can be configured to manage and facilitate the exchanges between users (e.g., at 468). The component manages correspondence between users where transactions are completed through a predetermined set of actions (e.g., approve, modify, decline, choose swap options, proceed to payment). According to one embodiment, the exchange component triggers a transaction process, presenting a listing object and/or request object to the respective users identified in a match. The system facilitates an exchange by, for example, allowing the users to modify the respective objects of the other users (e.g., via user inputs 472 or 474)—in one example the system enables a first user to tell a second user what to offer them so that they may accept.

According to one embodiment, the system 300 can include a restriction component (e.g., FIG. 3; 306, FIG. 4 470). The restriction component 306 can be configured to accept specification of limitations on brand associated exchanges, vendor associated exchanges, product associated exchanges, etc. According to one embodiment, the restriction component 306 is configured to build executable rules having matching conditions. The system and/or restriction component 306 can be configured to analyze user input to determine if any restriction rule matches a generated data object (e.g., listing object, swap object, request object, etc.). Responsive to matching a restriction rule, the system and/or restriction component 304 is configured to enforce the limitation specified. In some examples, the system and/or restriction component 106 can be configured to analyze user input, match to a rule, and analyze the parameters of the rule against the user input to determine what changes may be required to comply. According to one embodiment, the system can dynamically generate a display of potential changes to bring a listing into compliance, that the user can adopt via selection in a user interface (e.g., "accept" button displayed in conjunction with one or more changes).

In one example, the restriction component identifies a specific brand "A" detailed in a listing, matches the brand to a set of restriction rules (e.g., determines the user is authorized to list for sale or exchange items of that brand), as the user enters information describing the listing, each data entry point can be validated against the restriction rules.

In further example, responsive to a user entering a variant, value or other required details for a listing (e.g., specific color, finish, size), the system can determine that an aspect does not match the vendor data or another requirement. The system can identify the invalid condition and identify one or more options to change the listing to a compliant one (e.g., the size XL input by the user is not a size available in the product data object; product only was available in S-L). In another example, the system can identify the invalid condition and identify one or more options to change the listing to a compliant one (e.g., correct sizing, color, price, etc.) In some embodiments, the user entered data is visually flagged is the user interface as it is entered into the UI when the data entered is not in compliance. For example, the system can automatically generate a compliant value and display the compliant value next to the user data entry field in the UI. In one example, the system identifies the closest compliant value to the user entered value for display. In another example, the system can identify a range of compliant values for display in the UI. Once fully compliant listings are generated, the system can manage exchanges, direct sales, etc. of the listed goods.

According to one embodiment, the system 300 can include a reconciliation component (e.g., FIG. 3; 308 or 476). The reconciliation component (e.g., 308) can be configured to manage execution of exchanges between users. For example, the reconciliation component can be configured to ensure fair value exchanged between two or more users, and/or update listing objects as portions or parts of listings are fulfilled. In some embodiments, the reconciliation component 308 can execute in conjunction with the exchange component 304 to manage execution of a transaction. In other embodiments, the reconciliation component can be a sub-component of the exchange component.

FIGS. 19, 20, and 21 show example code for executing functions on, for example, an exchange system. The example implementation is provided as example and various embodiments can be programmed in other languages and employ the same or similar logical execution.

The reconciliation component can also be configured to trigger automated shipping and delivery function for the physical exchange reflected in the system listings. According to various embodiments, the reconciliation component can be configured to generate packing slips, shipping labels, etc., to facilitate actual delivery of purchased or swapped goods. In further embodiments, the reconciliation component 308 can also be configured to manage return of the same goods. In one example, delivered goods may not meet the description associated with a listing object, or the value of an exchange has been overstated. The reconciliation component 308 can be configured to automatically handle return of non-compliant goods, and manage credits, refunds, return swaps etc.

In some examples, the system can invoke the authorization component to de-authorize users where non-compliant goods were received or to enforce limitations on access to the system (e.g., over a probationary period), among other options.

According to one embodiment, the system is also configured to manage generation and distribution of product listings while enforcing specific restrictions associated with the brand or product.

For activated objects, the system requires the user to access product data objects provided by the vendor (e.g., product info, images, prices, value, etc.). In another example, the listing objects and request objects can be created with vendor product data objects (or administrator-approved custom objects) in order for matches to occur. For example, when a user is creating a listing object, the data objects provided by the vendor such as product information, variants, size options, etc., can be selected in the form of a drop down, or can be auto-populated from the system as more details are input by the user. In one example, the system automatically matched user input to candidate objects on the system. As the user continues to enter information, the system can unambiguously identify an object from the list of candidates. Once identified the system can use data from the identified object to evaluate a current listing being developed by a user FIG. 6 is an example screen capture of a user interface for building a listing object. The system can capture user input and match that input with product data objects. For example, when authorized retailers create listings, the master database can be utilized so that they can list the provided products at vendor-set wholesale prices.

In one example, the listing entity can trigger requests to the system admin for permission to post a non-compliant listing—only in response to an approval from the system administrator does the system permit non-compliant listings (including for example, limited permission (e.g., one time, threshold number of goods, etc.). In other embodiments, the system requires the user to correct any non-compliance before generating a listing object, including specification of the minimum information.

According to one embodiment, the minimum information includes brand specification, a product name or code, wholesale price, and any variant(s), sizes (if applicable) and quantities to enable consistent comparisons between offering on the platform (e.g., between different brands, different goods, etc.). In one example, the system is configured to reconcile a data object (e.g., vendor defined data object) and listing of any requirements within to determine the minimum information requirement to enforce. If the user input meets any requirements the listing object is complete. Once completed, the listing is classified in the appropriate directory for other authorized retailers to view and request to purchase or swap.

In various embodiments, a user (e.g., a provider) accesses the platform and creates a listing object or request object, where the system enforces listing information according to the product data object created by a vendor (e.g., the product data object can specify restrictions for brands, specific object, specific vendors, specific merchants, etc.).

In one example, the system executes a process for generating listing objects. FIG. 5 shows an example process 500 for generating listing objects. Process 500 can begin with authorization checks at 502. For example, an exchange system can provide each authorized retailer (e.g., of the affiliated brands) with unique log in credentials (e.g., once vetted).

At 504, once a user is logged into the platform, the user can trigger generation of listing objects (e.g., specify product for sale or exchange). At 506, the user can specify the classification of object being created (e.g., listing—to specify a good to sell or exchange, etc.).

At 508, during generation of a listing object, user entered information is validated against any brand restriction or participant restriction on the system. In one example, a brand manager can specify any number of restrictions including for example, specified approved retailers, products, product variants, and/or pricing. In other examples, system administrators can enter restriction information. These restrictions are analyzed during object generation (e.g., at 508), to identify any restriction that applies to the object being generated, and to validate user input information during generation against the identified restrictions.

As a user inputs information into an object, the input information is matched to restriction rules, the rules are applied as data is entered to ensure validity, and if non-compliance is detected 510 (Fail), process 500 may require the user to re-enter information that does not meet requirements at 512. In some examples, the matching rules are executed against input information as it is entered to identify options in the user interface for bring a listing object into compliance (e.g., at 512). Process 500 can be executed to identify a variety of options to bring a listing into compliance, and in some embodiments process 500 continuously updates a display of compliance based options as the user revisits or re-enters information within a listing object.

Once the information for an object is complete and valid 510 (Pass), process 500 can conclude with posting of the listing for access by other users at 514.

The exchange component generates a display of active listings for end users (514) by indexing them by their classification type (e.g., available for sale or swap, or both). The system may execute processes (e.g., FIG. 5; process 500) for generating listing objects to enable the users to execute transactions with each other safely, anonymously, and with the assurance each participant is complying with any restrictions specified by an originator of the goods (e.g., wholesale vendor). According to another embodiment, the system can be configured to limit the users from creating identical listing objects. In an example, a listing object can be created for the same product in different variants and the same sizes, but the system will halt a user from attempting to create a product with the same variant in different sizes (e.g. listing can be created for SKU: 3321; Color: Blue; Sizes: 1/XS, 1/S, 1/M and also for SKU: 3321; Color: Green; Sizes: 1/XS, 1/L. However, the system will restrict a duplicate listing from being created in the instance that the user tries to create a new listing for SKU: 3321; Color: Blue; Sizes: 2/XL. In such an example, the system can direct the user to the identical listing object to update sizes). In one, example validation at 510 can include a determination that an identical listing does not exist.

As discussed, as a user inputs information into an object, the system automatically matches the input information to restriction rules (510), applies the rules to ensure validity, and if the system detects non-compliance, the system can prompt the user to re-enter information that does not meet requirements (512). In some examples, the system identifies matching rules and executes them against input information to identifies options in the user interface for bring a listing object into compliance. The system can identify a variety of options to bring a listing into compliance, and in some embodiments is configured to continuously update a display of compliance based options as used revisit or re-enter information within a listing object.

FIG. 6 shows a screen capture of a user interface for building a listing object. According to one embodiment, the system requires the user to select the brand, product, variant details, listing type and can also require additional feedback for the vendor. In one example, the user is only able to see brands and products for which they are authorized (e.g., based on operation of the authorization component). In another example, the system may require the user to input the sizes and quantities for a listing. The following descriptions recites some example use cases during system execution: the user the image associated with the product or if there is no image and prompts to be taken. The user interface can include screens to request the user to confirm the displayed information for their listing. If the system validates the listing information, the listing is generated and posted for authorized users to view.

According to some embodiments, the system may execute processes for generating request objects (e.g., FIG. 7) to enable the users to execute transactions with each other safely, anonymously, and with the assurance each participant is complying with any restrictions specified by an originator of the goods (e.g., wholesale vendor). FIG. 8 is an example screen capture of a user interface that the system can display during execution of a process for generating request objects.

According to one example, the system executes a process for generating request objects. FIG. 7 shows an example process 700 for generating request objects. Process 700 can begin with authorization checks at 702. For example, an exchange system can provide each authorized retailer (e.g., of the affiliated brands) with unique log in credentials (e.g., once vetted).

At 704, once a user is logged into the platform, the user can trigger generation of request objects (e.g., product requested for purchase). Request objects can require a specific brand (authorization component) and can be posted with or without specific product and/or variant details (e.g. specific product code, specific color, size: any; another example: specific category, specific size, color: any, product code: any).

At 706, during generation of a request object, user entered information is validated against any brand restriction or participant restriction on the system. In one example, a brand manager can specify any number of restrictions including for example, specified approved retailers, products, product variants, and/or pricing. In other examples, system administrators can enter restriction information. These restrictions are analyzed during object generation (e.g., at 708), to identify any restriction that applies to the object being generated, and to validate user input information during generation against the identified restrictions.

As a user inputs information into an object, the input information is matched to restriction rules, the rules are applied as data is entered to ensure validity, and if non-compliance is detected (Fail), process 710 may require the user to re-enter information that does not meet requirements at 704. In some examples, the matching rules are executed against input information as it is entered to identify options in the user interface for bring a request object into compliance. Process 708 can be executed to identify a variety of options to bring a request into compliance, and in some embodiments process 710 continuously updates a display of compliance based options as the user revisits or re-enters information within a request object.

Once the information for an object is complete and valid (Pass), process 700 can conclude with posting of the request for access by other users at 712.

FIG. 8 shows example screen capture of a user interface for a create request process; 802 checks the authorization component of the system to only allow the user to request brands and products they are authorized for. 804 allows the user to select the sizes and quantities they need. 806 confirms the product request by showing the image of the product and 808 is the screen capture of the confirmation screen where the user confirms the details of their request, which upon approval can post to the requests directory.

According to one embodiment, shown in user interface is a requests directory ("Sell"), where request objects are visualized by the system to users so providers can input their availability to fulfill the request and initiate a pending sale.

FIG. 9 is an example screen capture of a user interface for a request display, the display is for end users viewing a specific request. According to one embodiment, the system shows the product information requested by an authorized user only to other authorized users. If the user is able to fulfill the need, the system collects the size, quantity and variant details (if any entered by a user) and the system initiates the sale request between the provider and the receiver.

Figure 10:
FIG. 10 is an example screen capture of a notification, according to one embodiment.

FIG. 10 is an example screen capture of a user interface for a transaction facilitation. According to one embodiment, the system can notify a requesting user of a status change, for example, responsive to an input request becoming available on the system. For example, if the user chooses to purchase, the user is direct to the matching listing, and the system provides the same functionality once visualized (e.g., the user can modify sizes/quantities desired and can proceed to checkout).

Figure 11:
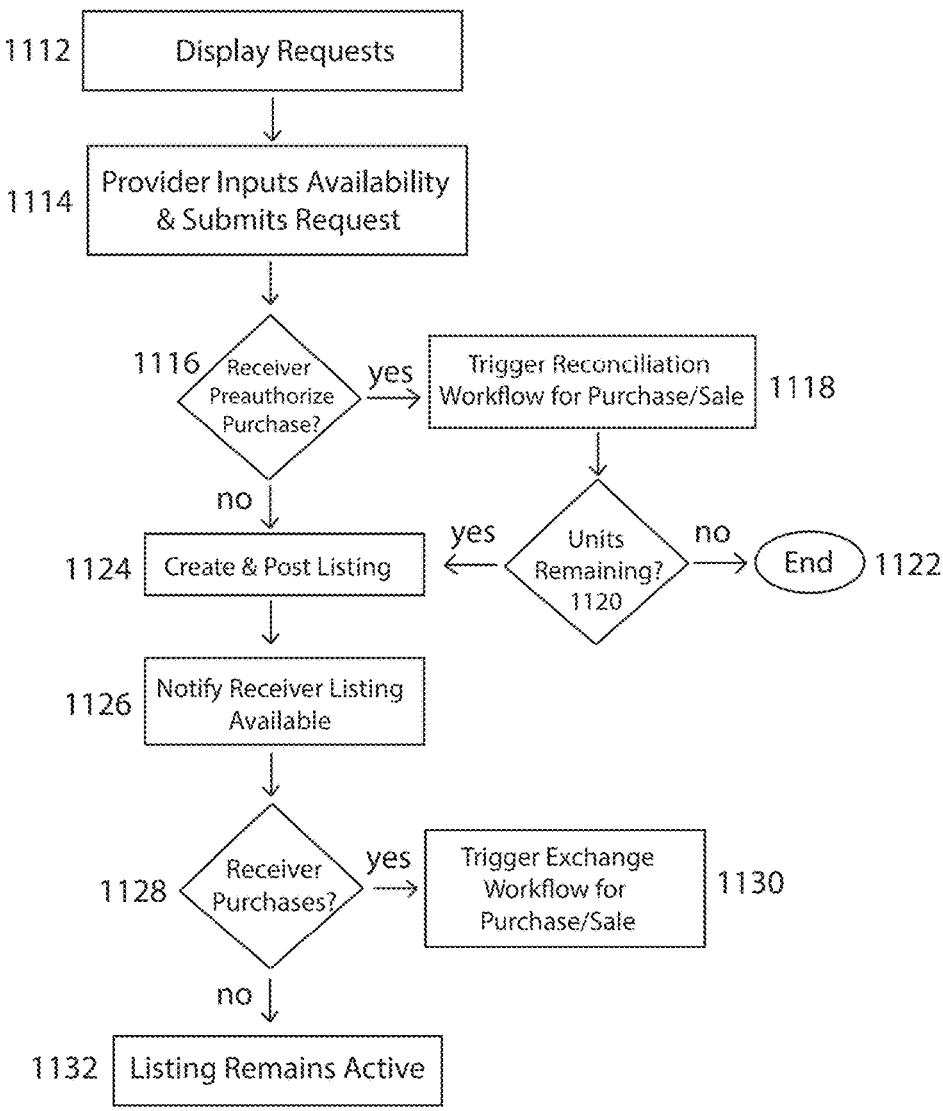
FIG. 11 is a block diagram of the request fulfillment process, according to one embodiment.

FIG. 11 is an example process flow for a request fulfillment process 1100. Process 1100 may be executed after other processes (e.g., process 700 FIG. 7). In one example, process 1100 may begin after an exchange process generates a display of active requests for end users to view (e.g., at 1112). At 1114 users in possession of a requested product can input the details of the goods (sizes, volume, variants) and submit to notify the requesting user. At 1116 the system checks to see if the receiver pre-authorized the purchase, if 1116 passes, reconciliation is triggered at 1118. If 1116 fails, the exchange component creates an active listing object using the data from the request object and the user's input information at 1124. At 1126, the system notifies the requesting user and directs them to the listing. If the requesting user declines the purchase request at 1128, the listing remains active; shown at 1132. If the requesting user proceeds to purchase at 1128, the system executes the exchange process for purchase/sale shown at 1130 (e.g. agreeing to terms, collecting payment, initiating sale request to provider, etc.).

In another embodiment where the requesting user has pre-authorized payment on an exact match to their request, the system can automatically approve the transaction and trigger reconciliation; shown at 1118. In another embodiment, if the provider input a greater quantity of units than what the receiver requested (1120), the system can generate a listing object for the remaining units (1124). If there are no listing units remaining, the fulfillment process reaches an end at 1122.

In another embodiment, if a new listing object is created and the receiver who has created a request object has a payment device in the system, the system can match the objects and generate an automatic approval of the purchase/sale (1116), followed by the system executing the reconciliation component at 1118.

Conventional systems fail to provide a connected network, automation for R2R transactions, nor dynamic analysis and visualization of options to bring data object into compliance as they are being generated. In this example, various embodiments of the system improve over conventional approaches by improving safety and efficiency in execution, limiting data entry error/user selection errors, and by providing user interfaces with new functionality that immediately visualizes and dynamically updates corrective options while ensuring compliance with restriction place by third parties who are not parties to the transaction.

In various embodiments, a user (e.g., a provider) accesses the platform and creates a listing object or request object, where the system enforces listing information according to the product data object created by a vendor (e.g., the product data object can specify restrictions for brands, specific object, specific vendors, specific merchants, etc.).

According to another embodiment, the system classifies and visualizes listings and requests for authorized users to view in various directories. For example. listings can be available in "Swap," or "Buy" or both directories. In the requests directory ("Sell"), request objects are visualized to users so providers can input their availability to fulfill the request and initiate a pending sale.

In some embodiments, transactions are completed with both the provider and receiver making transaction contribution objects, which can be provided in the form of listing units or monetary value. In some examples, the system generates a total transaction such that contribution objects from both provider and receiver have equal value. In further examples, the system can introduce additional parties into an exchange to clear an entire object—in other words multiple parties can commit to parts of various listing objects and a transaction cleared in multiple parts.

For example, transaction contributions that are made against a listing unit are deducted from the initial quantity of listing units producing a remaining quantity of the listing unit. In another example, transaction contributions can be in the form of another listing unit (e.g., in the scenario of an even swap transaction) or it can be monetary value (e.g., in the scenario of a purchase/sale transaction or uneven swap), among other options.

According to some aspects, the platform serves as an intermediary, facilitating R2R with the use of unique processes and workflows executed by the system. Various embodiments, enforce a consistent formatting of the data objects presented on the platform. In some examples, the system can automatically translate existing offers into appropriately formatted data objects to facilitate operations on the platform.

Figure 12:
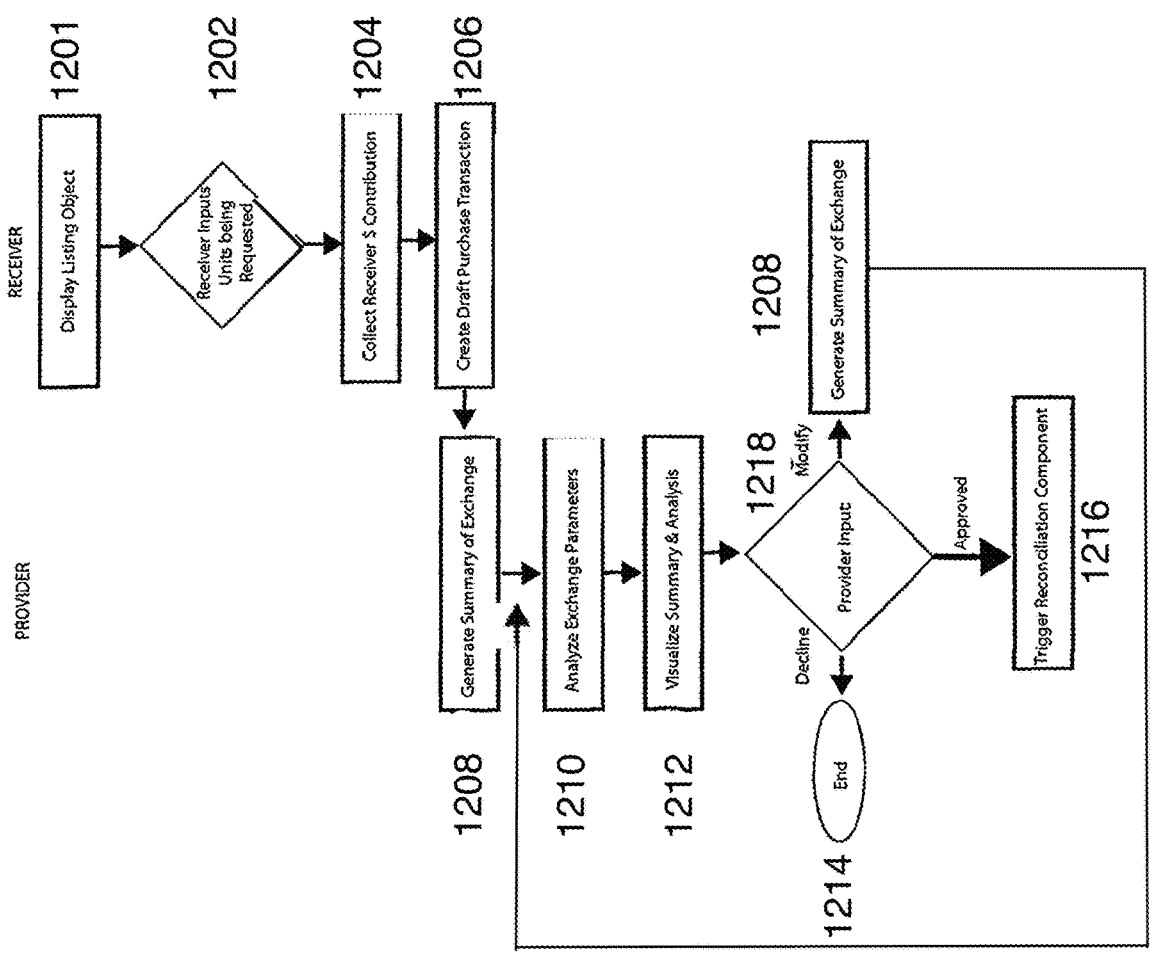
FIG. 12 is an example process of the exchange workflow for purchase/sale transactions, according to one embodiment.

According to another embodiment, the system is configured to manage correspondence between users pertaining to transaction requests using a set of predetermined actions and responses. In one embodiment, the system can execute an example process 1200 for managing a purchase/sale exchange, shown in FIG. 12. The system can provide visualization of a communication stream between exchanging parties as well as information and analysis on the proposed exchange. For example, process 1200 can begin with the requesting user inputting the sizes/quantities they want to buy (1202) based on selecting an object from a display shown at 1201. At (1204) the system collects payment information and pre-authorizes the amount due. At (1206) the system creates a draft transaction and at (1208) generates a summary of the exchange, at (1210) the system analyzes the exchange parameters and at (1212) shows a generation and display of a summary of the listing object(s) requested the provider.

According to various embodiments, the system executes at least one of three actions as part of process 1200; at (1214) the provider can decline the sale, where the system notifies the receiver and closes the draft with no further action to occur. At (1216) the provider can approve the sale and the system can trigger the reconciliation component. At (1218) the provider can modify the request (e.g., reduce quantities or sizes available), which then causes 1208, 1210 and 1212 to occur again before submitting the modified transaction request to the receiver. Upon viewing the modified order (1212) the receiver can decline (1214) approve (1216) or modify again (1218) causing 1208, 1210 and 1212 to occur again until the transaction finally reaches approval or decline.

According to various embodiments, the system manages an execution flow between users on the system which streamlines operation and the interactions between the requesting user and the provider. In various executions the sequence of operations discussed above (e.g. at 1208-1212) can be executed for the requesting user and the re-executed for the provider user as part of managing interactions between the requesting user and the provider. In further examples, multiple back-and-forth proposal and modifications can be seamlessly handled by the system until a final agreement or a cancellation of the exchange occurs.

Figure 13:
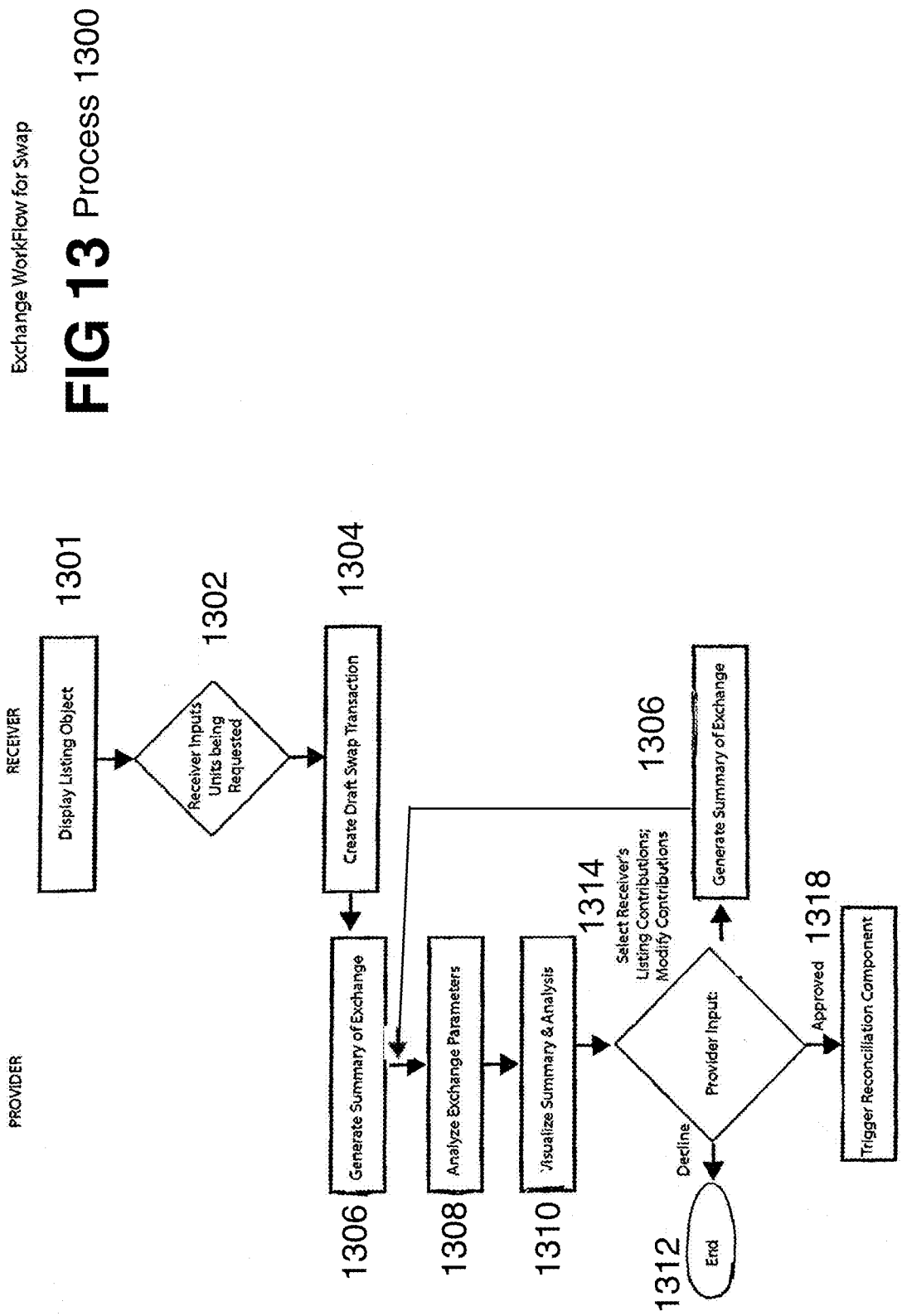
FIG. 13 is an example process of the exchange workflow for swap transactions, according to one embodiment.

In another embodiment, the system can execute an example process 1300 for managing a swap exchange, shown in FIG. 13. The system can provide visualization of a communication stream between exchanging parties as well as information and analysis on the proposed exchange. For example, process 1300 can begin with the requesting user inputting the sizes/quantities of the listing(s) they want to receive from the provider (1302) based on selecting an object from a listing display 1301. At (1304) the system creates a draft transaction and at (1306) generates a summary of the exchange request, calculating the total value of provider contributions requested by the receiver. At (1308) the system analyzes the exchange parameters where each element can be analyzed to provide information on comparative value, any overage, underage, discrepancy, etc. to enable each user to efficiently determine the next course of action for the user. According to some embodiments, analysis at 1308 can include confirmation of authorization for both parties of the exchange—typically a user is determined to be authorized to list a good or product during generation of listing object. With multi-party swaps the system can also confirm that a proposed listing object entered in response is authorized for both parties to the exchange (e.g., swap good "A" authorized to list by listing user "A," swap good "B" authorized to list by listing user "B," and good A & B authorized for receiving parties A & B). At (1310) shows a generation and display of a summary of the listing object(s) requested to the provider where the system allows the provider access to view the receiver's listings.

According to some embodiments, the system is configured to execute at least two actions as part of process 1300; at (1312) the provider can decline the exchange request (e.g., the provider did not like any of the receivers listings, or no longer has the requested listing available), where the system notifies the receiver and closes the draft with no further action to occur. At (1314) the provider can select the sizes and quantities of the receiver's listings that they are willing to receive in exchange, which then causes 1306, a summary of the provider and receiver's transaction contributions, 1308 and 1310 to occur again before submitting the exchange request to the receiver. If the user submitting the proposed exchange at 1314 is owed funds due to a difference in the values of the listing contributions, they can excuse the difference before submitting the request to the other user for a more likely chance of the exchange being accepted; see the "Call It Even" process, or they can submit with the true values of the listing contributions, where the transacting retailer will be requested to also contribute the cash value for the difference owed.

Upon the receiver viewing the summary of the contributions of both users, the system can be configured to execute at least three actions as part of process 1300; approve, modify, or decline. At (1312) the receiver can decline the exchange request, notifying the provider and closing out the draft transaction. At (1318) the receiver can approve the exchange request where the system can trigger the reconciliation component (1318). Or, the user can modify (1316), for example, update the listing units of either user involved in the proposed transaction (e.g., in the case where the receiver is dissatisfied with the difference in swap value). In other scenarios, users may add to a proposed exchange at 1316 (Modify), update to reflect changes in valuation, updates in quantity, etc. at 1306. The updated listing units are processed similar to an original listing, the updated exchange is analyzed and new visualizations of the summary can be presented at 1308 and 1310. The users can then continue to modify, approve, or decline the exchange.

According to various embodiments, the system manages an execution flow between users on the system which streamlines operation and the interactions between, for example, the requesting user and the provider. In various executions the sequence of operations discussed above (e.g. at 1208-1212) can be executed for the requesting user and the re-executed for the provider user as part of managing interactions between the requesting user and the provider. In further examples, multiple back-and-forth proposal and modifications can be seamlessly handled by the system until a final agreement or a cancellation of the exchange occurs.

In some examples of Process 1300, objects (e.g., listing, swap, etc.) rely on user entered valuation information. The system can be configured to evaluate the user entered valuation information and provide analysis of the entered valuation (e.g., compared to historic exchange high value (e.g., exceeds average by 10%), fair value (e.g., within average by +/−10%, low value (e.g., below average by 10%), which can occur as part of step 1308. In other implementations, different % values can be used, and in further example, statistical deviation can be used by the system to identify high value, fair value, or low value in various exchanges.

If either user declines the exchange (Decline), process 1300 ends at 1312, or, if the decline was selected for reason of "difference in swap value is too great," the user can optionally request a "Call it Even," (1320) discussed in greater detail herein.

Figure 14:
FIG. 14 is an example screen capture of a purchase request that the listing retailer must modify, approve or decline

FIG. 14 is an example screen capture of a user interface for a summary visualization of a draft purchase/sale transaction in the exchange process. For example, when a user requests a purchase, the system notifies the provider and displays this summary screen for them approve, modify or decline the sale.

FIG. 15 are screen captures of a user interface for a summary visualization of a draft swap transaction in the exchange process. When a user initiates a swap by selecting the listings they want from the provider, the system notifies the provider and displays (1502) a screen capture of the summary screen for the provider to view the receiver's "swap options" e.g., listings and can modify the listing units requested of them, or decline the request. When the provider has made their selection of the receiver's contributions that they want to receive in exchange, 1504 is a screen capture of the visualization of the transaction, displaying a summary to the receiver and prompting them to modify, approve or decline.

In one embodiment, reconciliation can include determining any monetary portion of an exchange (e.g., cash equivalents for differences in goods value, direct purchase value, etc.). Reconciliation can also include automated for generating shipping labels to facilitate physical transfer of products or goods. Once reconciled, the goods can be shipped and accounts debited or credited.

FIG. 16 is an example process flow 1600 for reconciliation of an approved purchase/sale transaction. Upon a seller approving a sale, the system requires a pre-authorization of a payment device from the provider for the amount of their listing contributions and any amounts for fees that can result from an RA at 1602. If the seller neglects to submit a payment device at 1604, the order is not approved and cannot process (1606).

According to one embodiment, upon the provider successfully submitting the payment device for the pre-authorization in 1604, the system charges the receiver's payment device on file for the amount of the listing contributions, fees, shipping costs, etc. (1608). The system then updated the provider's listing units at 1610 and generates a packing slip and shipping logistics at 1612.

The system monitors whether or not the orders ships out at 1614. If the provider cancels the sale, or does not ship out the order as shown at 1616, the provider is charged necessary fees and the receiver is refunded. According to one example, no further action is taken by the system at this point. In the case where the order ships successfully at 1614, the system receives a delivery confirmation at 1618 and prompts the users to confirm the goods at 1620. The receiver can request an RA for damaged or erroneous goods at 1622. If the entire order is approved for return authorization by a system administrator, at 1624 the system can refund the receiver, charge the provider for shipping and fees, and schedule a return of the RA. If a partial return authorization is approved, at 1626 the system can charge the provider for the value of the RA goods and any associated fees, pay out the amount of the RA goods to the receiver and schedule a return of the RA goods, if necessary. Once this is completed, 1628 occurs where the provider receives the original payout for the full amount of their contributions.

Upon order delivery confirmation 1618 if the goods are acceptable to the receiver at 1620 or the allotted amount of time passes where a user may request an RA, 1628 occurs, where the provider receives the payout for the sale and the order is complete.

FIG. 17 is an example process flow 1700 for reconciliation of an approved swap transaction. According to various embodiments, within the exchange process, if both the provider and receiver approve the exchange, reconciliation is triggered. At 1702, the system requires a payment device to be submitted from each user for the payment amount for any difference in the value of swap contributions and the amounts due for fees and shipping. Once payment devices are provided, the system simultaneously processes a pre-authorization of a payment device from both users for the amount of their listing contributions, in the case an RA is requested. Both users must approve the exchange before the system can collect payment. If one user pays and the other user neglects to submit payment within a reasonable amount of time, the order is canceled and the user which paid is refunded at 1706.

Upon both users successfully submitting payment devices at 1704, the system pays out any differences owed at 1708, updates the listing units of both users at 1710, then generates a packing slip and shipping logistics at 1712.

If the provider or receiver cancels the order, or does not ship out their listing contributions as shown at 1714, the faulty user is charged for the value of merchandise they did not ship and any necessary fees and the system pays out the transacting user for the merchandise they did not receive at 1716.

According to another embodiment, after payment has been collected at 1704, the system does not permit approved swap transactions to be reversed; thus the contributions the user requested must still be received, even if their outgoing shipment is not executed or the user attempts to cancel the order.

According to some embodiments, the system receives a delivery confirmation at 1718 and prompts the users to confirm the goods at 1720. If the goods are not acceptable, the transacting users can request an RA for damaged or erroneous goods, and upon approval by a system administrator, at 1722 the system can charge the faulty user for the value of the RA and any associated fees, pay out the valid user and schedule a return of the RA, if necessary. If the goods are acceptable to both users at 1720, or the allotted amount of time passes where a user may request an RA, 1724 occurs, where the order is complete.

FIG. 18 is an example of the reconciliation formula. According to one embodiment, the reconciliation formula requires equal contributions from both users in an exchange in the form of listings or monetary value. In the case of a purchase/sale, the receiver is contributing monetary value equal to the listing contribution of the provider, the goods are exchanged and the monetary value is paid out.

Within the reconciliation formula in the case of a swap transaction also visualized in FIG. 18, if the value of the listing contributions of each user is not equal, an additional contribution in the form of money is required from the deficient user. In such a case, the difference is paid out to the due user and the goods are exchanged.

FIG. 19 is an example of code of an exchange system that can execute as part of the reconciliation for an approved purchase/sale transaction. According to one embodiment, the system assigns the request a transaction number and identifies the provider and receiver by their user numbers. The system itemizes each of the provider's listing units involved in the transaction (e.g., starting at zero, ascending in number) and provides the details of product code, color, number of units, size and value. The receiver's contribution is identified as type: "cash" equivalent in value to the provider's contribution. In a purchase/sale reconciliation, although each is making a contribution, the "total values" identified at the end of the code reveal the value of merchandise that is actually shipping out. For example, the provider line will show a positive amount, and the receiver's value will equate to zero.

FIG. 20 is a sample code of the reconciliation formula for an approved swap transaction. Similar to the purchase/sale reconciliation code, the system assigns the request a transaction number and identifies the provider and receiver by their user numbers. For both the receiver and the provider, the system itemizes each listing unit being contributed in the exchange transaction (e.g., starting at zero, ascending in number) and provides the details of product code, color, number of units, size and value. Any fees and shipping costs are specified as "provider_fee" and "provider_shipping" "receiver_fee" and "receiver_shipping." The system notates the "Call it Even" with a true/false response line.

The system can require the user to make an additional cash contribution if the contribution amounts of the two users are unequal, in which case the system creates an itemized line identified as type: "cash" equivalent to the deficient amount. The "total values" identified at the end of the code reveal the value of merchandise from each user that is actually shipping out.

FIG. 21 is an example of the sample code for the "Call It Even." For example, if the value of the listing contributions of each user is not equal, the user who is owed the difference in value can select to "excuse the difference." In this case, the system increases the deficient contribution to equal the greater contribution. In such a case, the goods are exchanged as if they were equivalent in value and no funds are collected or paid out for the difference.

FIG. 22 is an example screen capture of a user interface for visualization of a "Call It Even" function. According to one embodiment, the screen shown is that of the user who is owed funds from a swap transaction where the deficient user is requesting a "Call It Even." The summary shows both the amount being received as $800 and amount being swapped out as $800, when in actuality, the user is only receiving $720 in exchange. The user can choose to approve the "Call It Even" (trigger reconciliation) or decline it (end the transaction) on this screen.

In further examples, the system is configured to manage restrictions as part of generating listings, managing swaps, and monitoring execution for compliance (including e.g., ensuring only authorized retailers are permitted to create listings or requests and for the specific object listing being created). According to one embodiment, the system is configured to create product data objects specific to each user that includes their product information, including SKU or product code, variants, description, images and wholesale price lists. The system accepts information from the user (e.g., wholesale vendor) via custom user interfaces.

In some embodiments, regardless of transaction type, the system requires transaction contributions to follow execution logic (including for example, compliance with restriction rules). For example, in a pending sale transaction the receiver can provide a transaction contribution in the form of monetary value equal to an amount of listing units selected in a user interface. In a pending swap transaction, the provider of the listing can find an equivalent value of transaction contributions that they want from the user who initiated the swap.

According to an embodiment, the system can execute transaction logic to analysis listing objects for value—for example, if there is a listing unit on a transaction contribution, the system evaluates the value and determines the total unit value times the quantity. In an example where, there is no listing unit (example, a purchase/sale transaction) then the value will be set by the user initiating the transaction; meaning the amount that is necessary to purchase. In such examples, the system can be configured to evaluate the set pricing to determine if it is in expected ranges (e.g., fair value), set too high (e.g., exceeds percentage of same/similar transactions, set low (e.g., below percentage, etc.) and report that information in the user interface.

In another embodiment, the transaction contributions will be created by the receiver on the behalf of listing provider and then the system enables the provider to find contributions for the receiver to contribute. According to this embodiment, each party of the transaction provides information to the system to decide what the other party will be contributing.

In some embodiments, the system is configured to manage execution of orders (e.g., via building and executing order objects) responsive to determining that the provider and receiver are in agreement and approve the transaction. According to one embodiment, the execution of an order can include a series of automated events (e.g., payments, packing slips, shipping labels, call tags, tracking and rating) that results in the transfer of products from one retailer to another.

In another embodiment, the system can require no payments for transactions in the instance where the vendor is utilizing the system to move inventory between their free standing stores. In another aspect, the data of user listings, requests and orders in regards to each affiliated vendor can be collected and aggregated, providing the vendor with more visibility and a newfound ability to access specific information on unsold products within authorized retailers.

According to one embodiment, the system displays an interface for users to update their listing and request objects. For example, if a product is sold in-store, the interface allows for the user to adjust the quantities of listing units in the listing object. In another example, if a user no longer needs a product, the interface allows for the user to deactivate a request object.

According to another embodiment, the system automatically updates the active listings and request objects as orders are fulfilled. According to another embodiment, the system automatically deactivates listing and request objects and/or adjusts quantities of listing and request units as transactions are declined (e.g., for reasons related to availability). Further, the system is configured to display changes on the user interface when the user is viewing screens relating to active listing and request objects.

The system can also be configured to execute a variety of enforcement processes to maintain compliance.

Example Vendor Control: Authorization Object & Product Data Objects

According to one embodiment, the system is configured to activate only those specific retailers for a specific vendor on the platform. Shown in FIG. 2 is an illustration of the connection network managed by the system, that associates specific brands with retailers (e.g., who may be individually authorized to list any one of the specific brands). In some examples, the system matches a user's account information to activated vendors and/or listings, and only displays options associated with activated data objects (e.g., offers, request, etc.). As discussed, various embodiments of the system enforce requirements to view and/or operate on respective data objects (e.g., listing or request objects). For example, the system enables vendors to define authorization data objects which establish a list of authorized retailers. For example, authorization data objects can be linked by a vendor to a specific brand and all products that match on the brand designation, limiting or allowing users to access and/or perform exchanges on any goods matching the brand designation. Authorizations object can be linked by a vendor to specific user lists as well, such that only users within a authorized list can see or operate on listings associated with a given vendor. For activated objects, the user can access information provided by the vendor (e.g., product info, images, prices, value, etc.) to executed exchanges or purchases. The system maintains a master database of all options that can be to be used for creating listings and requests. Generally, respective users only see a subset of available offers, listings, and/or requests as users are typically not activated for all entries in the master database.

In another example, authorization objects can be associated with specific good or grouping of goods, such that only listed users can access and/or operate on associated listings.

In some embodiments, the system is configured to limit activation of users (e.g., retailers) to those defined in the authorization data object. For example, if a retailer is not defined within the authorization object for a specific brand of product or for a specific vendors, the system can be configured to prevent those requests or listings from being shown in the user interface associated with the retailer's system and/or login. In other examples, the retailer can see a summary listing or request, but is prevented from accessing detail associated with the listing or request. In yet other examples, the system allows access to the listing and/or request but prevents further action (e.g., purchase, swap, etc.). According to some embodiments, the system can be configured to request authorization to an originator, add the requestor to an authorized retailer list (including, for example, temporary authorization or limited number of operations authorization), and permit further action as an authorized user.

In some examples, the system matches a user's account information to the vendors that have defined that user in respective authorization data objects. The system can be configured to only displays options associated with data objects (e.g., listings, requests, etc.) matching their authorizations.

In other embodiments, system administrators and/or vendors can remove a retailer from a respective authorization object. Consequently, that user can no longer perform actions on unauthorized lists, and in some examples, can no longer see them as options in the user interface. In another instance, a retailer can choose to remove a brand from their user interface, subsequently removing the user from the vendor's authorization object. For example, if a user is no longer selling a vendor they are authorized for and the vendor has not removed them from authorization on the system, the user can choose to remove the brand from their interface, which notifies the system administrator.

According to some embodiments, the system can be configured for a user to request authorization for a vendor. The system permits administrators to add the requestor to the authorization object of the vendor, and permit further action as an authorized user. The system also allows for administrators to decline the requestor, preventing access to said vendor on the system.

Stated generally, the system can be configured to control access so that respective users only see a subset of available offers, listings, and/or requests (activated objects) as users are typically not activated for all affiliated vendors in the system.

In one embodiment, the system controls execution so that transactions (whether purchase/sale or swap of goods) maintain the assurances of equal asset and/or value contributions from each authorized users. In other embodiments, restriction rules are executed by the system so minimum value requirements are met even in swaps for different goods. In some settings, minimum value restrictions can disable features on the system (e.g., disable "call it even" functionality when minimum value would not be met).

Example Listing Objects

According to one embodiment, the system is configured to manage generation and distribution of product listings while enforcing specific restrictions associated with the brand or product. For example, the system generates and displays a "Create a Listing" interface, where an authorized user can list unsold products by creating a listing object. In various embodiments, listing objects are composed of listing units. For example, a listing unit is composed of one size (if applicable) of one variant (e.g.; specific color, fabric, finish, etc.) of one product. The system can be configured to manage a variable associated with the listing unit so than the listing object has an initial quantity and a remaining quantity, as various execution (e.g., swaps, purchases, etc.) are completed.

According to one example, a listing is created for a particular grey dress with five size larges (one listing unit with initial quantity of five) and three size smalls available (one listing unit with initial quantity of three). Responsive to an approved transaction for one size large and two size smalls (total of three pieces of the grey dress), the system then reduces the listing units quantities by one and two respectively. In the example, The remaining quantities variable reflecting the size large listing unit is four, and the remaining quantities variable reflecting the size small listing unit would be one.

According to some embodiments, the user creating the listing object can modify the listing units or deactivate the listing object at any time.

Example Interface for Listing Creation

In one embodiment, the system can create a listing object using the product data objects provided by the vendor (e.g., product info, images, prices, value, etc.) responsive to user input.

Please explain how vendors provide product data objects

Vendors provide product data to the system administrator via csv/excel files, which are uploaded to the admin via various methods (custom system interface import or accessed through google drive). When a listing is created, the product data object is pulled from this and the newly created listing's data is stored in the system database.

Please define what data elements go into a product data object

Examples are: Product Code (SKU), Color, Finish, Description, Composition, Wholesale Price, Size Variants, and any other number of specific product variants related to a specific product.

Do vendors log into the system and create, etc.

Vendors can log into the admin to manage their retailers, products, and view data and reports regarding the listings and requests of their authorized vendors.

According to one embodiment, the system displays a user interface "create a listing" with prompts for completing a series of steps (e.g., one, two, three, four) to gather all required information about a product and its availability. For example, when a retailer wants to list a product, the user can log into the platform with their unique user credentials and select in the user interface "List What Didn't Sell" on the main screen.

As the listing is being generated, the system is configured to require input of brand, product code, variants, quantities, and other related specifics (e.g., collection, year, sizing, composition) and requires the user to classify the listing e.g., available for swap, sale or both). Further, the system validates any restriction on the vendor, goods, or brand to ensure compliance. In some examples, non-compliant entries are permitted initially, but flagged for the system for resolution.

In the UI, the system can prompt the user to select a brand, a collection, a year, a product code and to specify variants of the product (e.g., color, finish, sizes, etc.). In one example, product information input by the retailer can be matched by the system to a vendor's product data object and the associated data fields can be populated from the product data object. As the product information is generated and/or captured, the system can also validate the listing object against any restrictions stored on the system. In one example, a cost associated with the item is automatically populated from the data after the product (and/or product data object) is selected.

In some embodiments, the user interface can also be configured to present a series of questions to gather feedback for the vendor (e.g., reason for listing and duration in-store, and/or reason for swap, etc.).

According to one embodiment, the system requires the provider to specify what they are willing to do (e.g., sell, swap or both) in order to move the product. This selection determines the availability of the listing object and how the system will index (e.g. classify) the resulting data object. For example, based on indexing the data object the listing can be display in the "Buy" directory, "Swap" directory, or in both directories. As part of listing generation, the system requires entry of the quantities and sizes (if applicable) of the product. In some examples, the user interface prevents the user from advancing to additional screens until the minimum required information in submitted (and, for example, validated against restrictions).

According to one embodiment, responsive to matching the listing object to a vendor's product data object, the system retrieves and displays an associated image. The image display limits improper matches and/or identifies improper matched before additional processing occurs. Confirmations at this stage reduce user selection error over conventional approaches and improve execution efficiency of the system.

According to some embodiments, the system can flag missing data elements as the user progresses through listing generation screens, and present required data elements for the user to correct any non-compliance as a final screen or screens before generating or completing a listing object.

Listing validation can include system analysis on compiled product details, total calculated value of the listing object, per item value, etc. The system can prompt the user to confirm the respective valuation information. In some examples, the system can identified any issues with restrictions (e.g., minimum value not met, etc.). If determined compliant, the system can optionally request user agreement to the terms of use (e.g., including refunds or charges for non-conforming goods, etc.) complete generation of the listing object (with any specific listing units), which is then posted in the appropriate directory (e.g., swap, buy, etc.). According to various embodiments, the system is configured to enforce minimum information requirements for generating listing objects. For example, a minimum set of data requires: brand specification, a product name or code, wholesale price, and any variant(s), sizes (if applicable) and quantities of each. Enforcing the minimum data requirements enables the system to provide consistent analysis (e.g., comparisons) between offerings on the platform (and for example, between different brands, different goods, different variants, etc.) and to match listing objects with request objects.

In further embodiments, the system validates any restrictions provided by a vendor, brand manager on respective products to ensure compliance. For example, when a custom listing object is created for a product that does not have a matching vendor product data object, the system is configured to require input of brand, collection, year, SKU or product code, variant(s), wholesale price, sizes (if applicable), quantity, reason for listing, availability of offering (sale, swap or both), duration in store. Thus, even with custom listing objects the system can provide analysis of value on respective offers, and further identify variations in valuation for specific listings. This analysis can be integrated into listing generation, as well as provided to reviewing users looking to execute purchases or exchanges. Unlike conventional approaches, the user interface couples valuation analysis and displays with transaction execution enabling users to access other retailers' inventory, assure more accurate data, transact more efficiently, and validate operation in a way unavailable to conventional systems.

According to another embodiment, if there is no image associated with the vendor's product data object, the provider is prompted to take or upload an image for the listing. Responsive to introducing the new image, the system treats the listing as custom and can impose additional information requirements to enable validation.

In one embodiment, generation of a custom listing object can trigger additional validation operation by the system. In one example, the system assigns a candidate or un-validated status to a custom listing. Only in response to administrative action to change the status to validated are such candidate listings able to be accessed by end users. In one example, an administrator can change a listing status. According to another embodiment, the listing generation interface is configured to allow multiple listing objects (e.g., from the same user) to be linked as a "set." These set objects can only be executed in their entirety, and the system can be configured to disable functionality associated with partial submissions. In one alternative, the system is configured to automatically reject any partial requests on set listings.

Responsive to confirming a listing, the user is asked to confirm any terms of service before continuing. Once accepted, the listing can be saved to the database. The system is configured to build listing data object where the listing data object is associated with the vendor, the retailer, and the product.

Example Request Objects

According to one aspect, the system is configured to manage generation and distribution of product requests while enforcing specific restrictions associated with the brand or product. According to one embodiment, request objects can be generated to include listing request units (e.g., specific types of objects within a general class (including for example different size, cut, configuration, etc., of the same product). For example, a listing request unit is composed of one size (if applicable) of one variant of one product. A listing request unit has an initial quantity and a remaining quantity.

According to another example, a request object is created on the system by a user, that specifies a particular product (e.g., a brand name, a product, and color (brand A white shirt)), specifies five shirts size large (one listing request unit (e.g., large shirt) with initial quantity of five) and three shirts size small (one listing request unit (e.g., small shirt) with initial quantity of three). When the receiver complete a purchase transaction for the requested product in one size large and two size smalls (total of three pieces of the grey dress), the system then reduces the listing request units quantities by one and two respectively. The remaining quantities for the size large listing unit would be four, and the remaining quantities the size small listing unit would be one. In another embodiment, partial fulfillments of listing request units result in the system prompting the user to confirm if they want to keep the request object active (do they want to still receive the remaining listing request units). In another embodiment, the user can modify the listing request units or deactivate the request object at any time.

Example Interface for Request Object Creation

According to one embodiment, the system generates and displays a "Create a Request" interface responsive to user selection. According to various embodiments, the system enables an authorized user to create a request for a product. The user can search for and select data objects provided by a vendor (e.g., product info, images, prices, value, etc.) that detail the specifics of a good or product that they wish to request for purchase from another authorized retailer. In one embodiment, the interface displayed by the system prompts the user to complete a series of steps (e.g., two, three, four, five, etc.) to gather all required information about the product the wish to purchase.

For example, when a user wants to request a product, the user logs into the platform with their unique user credentials and then selects "Request" on a display screen. In one example, the user creates a request object on the system, which can incorporate information from a vendor's product data object. During creation, the system prompts the user to select the brand, collection, year, SKU or product code, and variants of the product they desire. In examples where the vendor data object is used, the system automatically generates a cost for the request and/or specific items within the request.

In some embodiments, the system can allow the user to set up a payment device in advance where the system can auto-approve a purchase upon the exact request object becoming available.

According to another embodiment, the request object can be created with an open-end designation of brand, product code or variants, instead of limiting to an exact product match. For example, if a pair of sunglasses comes in four colors, the user can select "I am open to other colors" in the UI instead of picking only one. Alternatively, the user can leave the specification of color blank—responsive to a blank variable, the system is configured to confirm with the user—no selection in this field means any color of this product is being requested. A prompt can be generated by the system for any such open field options. According to some embodiments, the system is configured to identify matching on open fields, and report the match to the user for confirmation. In one alternative, the user can specify to the system to make the purchase on any match of the open field. In some embodiments, the system can be configured to collects feedback for the vendor (e.g., reason for requesting). In an another embodiment, the system can be configured to require a request object to only specify a brand, variant or size, notifying the user of any listing objects that match the criteria. For example, the system can be configured to require the minimum input of a brand, variant or size. In another example, the user can request a size or variant without a specific product code or brand, such as a request for any size XL, black, dress, from any vendor for which they have authorization.

In one embodiment, the system requires the requesting retailer to specify how long they want the request to be active. For example; the duration of the request specified by the user when creating the request object limits the amount of time the request object is active in the system. On the expiration date selected, the request object becomes disabled and no longer shows in the "Sell" directory for authorized users to view. The disabled request object is also no longer matched with new active listing objects.

In another embodiment, the system permits the requesting user to not limit the request object to a duration of active time. For example, request objects without an expiration date will remain active and show in the "Sell" directory and match with new active listings until the user updates or removes the request.

As part of object definition, the system can require entry of the quantities and sizes (if applicable) into the user interface. If the vendor's product data object has an image, the associated image is displayed to confirm the product. According to various embodiments, the system validates data entered into the object and can be configured to require the user to correct any non-compliance before generating a request object, including specification of the set of minimum information.

According to some embodiments, the system is configured to compile the product details and generate total value information within the request object for the user to confirm. Upon confirmation, the user can be presented with term of use associated with listing the request. Once agreed, the request object is created and the system can post the request to a "Sell" directory.

In another embodiment, when a custom request object is created for a product that is not associated with a vendor's product data object, the system is configured to treat the request as a custom data object. In various embodiments, custom data objects trigger additional processing, and can include additional requirements for information: for example, input of brand, collection, year, SKU or product code, wholesale price, size(s), quantity, reason for request, duration of request, and image of product can be required to generate a custom data object.

In one example, the custom request object can trigger a request to a system administrator for permission to allow the request object to post. In some examples, a custom request not found in the brand's product data object can only be activated in response to an approval from the administrator.

Upon confirming a request, the system may require that the user agree to the terms of service in the UI. Once completed, the request object is associated with the vendor, the retailer, and the product in the database. When a request object posts, the system is configured to execute a search for matching active listing objects. If the system generates a match, the user is notified, for example, in the UI or in an "Alerts" section of the system. The user can also be automatically transitioned to the listing screen associated with the matching item. Whether or not a match is found, the request is displayed in the requests directory until the request object is fulfilled or removed.

Example Processing for Listing/Request Matches

According to one embodiment, associations are dynamically determined by the system between active requests and active listings. For example, the system can automatically identify candidate matches between a new listing request and existing listings on the platform. In further examples, the system can generate candidate matches based on similarity of product, product category, similarity in price range, similarity in wholesale value, etc., to determine a match between an active request object and an active listing object.

In another example, the system can automatically identify candidate matches between a new listing and an existing request. In some embodiments, the system identifies a candidate match and can automatically generate a transaction between the users related to the matched objects. In another example, if a new listing object is created and the receiver has a payment device in the system, the objects will be matched and generate an automatic approval of the purchase/sale, followed by the system executing the reconciliation component.

As discuss, restriction mechanisms can be enforce on listing or request objects to ensure that minimum information for consistent comparisons between offerings on the platform (e.g., between different brands, different goods, etc.) is entered. In some examples, the minimum information can include brand, collection, year, product, variants, sizes (if applicable) and quantities.

In further embodiments, the system can generate candidate matches between listings and requests based on similarity of product, product category, variant, similarity in price range, similarity in wholesale value, etc. Candidate matches can be visualized to users as they generate and confirm their own listing or after they create their active listing or request object. Where the candidate match is based on similarity, the system gives the current user the option to execute their new listing against the candidate match—in some examples, the match is not complete (e.g., objects have different values for listing units, different quantity, different variants, partial match, etc.) and further processing can be triggered to complete an exchange, as discussed further below using various transaction contributions.

According to one embodiment, responsive to the system determining a match, a pending purchase/sale transaction can be initiated by the system between the provider and the receiver. In various embodiments, different execution scenarios can occur as discussed herein.

Example Processing for Buy Directory & Purchase Initiation

According to another embodiment, the system is configured to display a "Buy" directory based on the indexing of listing objects that specify for purchase only. Users are able to browse the listings of only the brands that they are active and for those objects defined for the user as being within vendors' authorization objects. In various embodiments, the authorized users of the same vendor can view active listings and initiate a purchase transaction of a listing object associated with that vendor.

According to another embodiment, the system can execute a buy process flow. In one embodiment, the buy process flow can begin with a user login and navigation to the display of listing objects (e.g., select the "Buy & Swap" section from the user interface). The process continues with a user viewing a listing, selecting the sizes/quantities and selecting "BUY" is the user interface to proceed with the purchase. The buy process flow can include payment through the system, which triggers purchase transaction request with the provider (the seller).

According to another embodiment, the requesting user is prompted to view additional listings from the same user for the same vendor in order to increase the provider's total transaction contribution within the request. According to another embodiment, once the receiver has completed their purchase request with payment, the system reserves the provider's listing units that were requested and can prompt the provider to approve, modify or decline the transaction. In one example, the listing units remain reserved until the provider responds or a certain amount of time passes.

Example Processing for the Requests Directory

In another embodiment, the system to configured to manage and display a "Sell" directory in the user interface. In some embodiments, the system build the sell directory based on indexing request objects, which can be filter by any user authorizations. Providers can view requests for products in this directory and can respond to a request object by inputting the variant (if not specified), sizes (if applicable) and quantities available to send to the requestor.

According to another embodiment, the system can automatically create an appropriately formatted listing object when a provider responds to a request object. Further, the system can notify the requesting user. The system can post the listing immediately in the "Purchase" directory or, can reserve the listing object for that requesting user for a limited time. According to various embodiments, the system does not generate a transaction and no transaction contributions are created on behalf of the provider when they respond to a request object, rather a listing object specific to the request is generated, and the requesting party can review the listing object that matches their request.

For example, once a response is made by a provider, the system directs the requesting retailer to the listing. If the receiver initiates a purchase request, the system can be configured to carries out the processes mentioned above for Purchase/Sale Transaction and Order Execution or complete similar processing.

In another embodiment, the system can trigger automatic approval of a purchase/sale transaction via the "Sell" directory. For example, if a user has a payment device inputted and selected to approve purchase if the request becomes available, then upon a provider responding to the request object within the directory, the purchase/sale transaction will be automatically approved and the reconciliation will trigger.

According to another embodiment, if the provider input a greater quantity than was requested, the system creates a listing object with the remaining units and posts it for other authorized users to view and purchase.

According to another embodiment, if the requesting retailer declines the pending purchase request, the system can be configured to keep the listing object active, which for example, makes the listing object available for other authorized users to purchase. According to another embodiment, if the requesting retailer declines the pending purchase request, the system prompts the requesting user to update their request object. According to another embodiment, if the requesting retailer declines the pending purchase request, the system can automatically update the listing request units and/or deactivate request objects.

For example, if the user selects the reason for decline as "No Longer Needed," the system can deactivate the request object and reflect the update in the user's interface for active requests. In another example, if the request is fulfilled by the receiver purchasing the listing object generated through the requests directory, the system can automatically update or remove the fulfilled request object or prompt the user to do so.

Example Processing for Purchase/Sale Transaction and Order Execution

In one embodiment, the system can be configured to initiate a purchase/sale transaction when a user makes payment for a purchase request and notifies the provider to approve, modify or decline the request. In another embodiment, the system generates a receiver transaction contribution (in the form of monetary value) as equivalent to the total listing units requested (and paid for). The system can requires the provider (seller) to make a transaction contribution of equal amount with the actual listing units.

In another embodiment, where a receiver proceeds with a purchase request, the system can be configured to create a transaction where for each different size of the specifically chosen variant of the listing, a transaction contribution object is created whose quantities matches the number of units that were requested. In the example execution, the system determines a total value based on the unit cost of the listing and the number of units in the request/order.

In another embodiment, the system allows the provider to decline the purchase/sale request. For example, a provider can view a summary of the listing units that were requested. The user interface displaying the summary includes at least one option for the user to select "decline."

According to another embodiment, if the provider declines the pending purchase/sale request, the system prompts the provider to update their active listing objects. For example, if the provider selects the reason for decline as "No Longer Available," the system can deactivate the listing units and/or listing object and reflect the update in the provider's interface for active listings.

According to another embodiment, the provider can modify the transaction to reflect the quantities of listing units actually available at the time of the transaction request. For example, if the provider can only partially fulfill the transaction request, the system adjusts the provider's transaction contribution and modifies the receiver's contribution, refunding any monetary amounts necessary in order to make the transaction contributions equal.

In some instances of a purchase request, only a pre-authorization is made on behalf of the receiver. In this case, the system processes the payment only after the provider has confirmed their listing units available. In some embodiments, the receiver is charged the amount equal to the provider's total transaction contribution responsive to both parties completing their portion of the exchange.

In other instances, when a vendor is moving inventory between freestanding stores, the system can require no payment to be made on purchase/sale transactions. For example, vendors with stores that exclusively sell the vendor's brand can use the system to monitor the inventory levels of non-performing merchandise and exchange the merchandise between their locations.

According to another embodiment, the system can be configured to require a payment method from the provider and pre-authorization for the amount of the provider's transaction contribution amount, in case of return authorization on part or all of the order.

At the point in a transaction where the provider has approved the purchase request, payment has been collected from the receiver and a pre authorization has been collected from the provider, the system executes the purchase/sale order process.

In another embodiment upon the provider's order approval, the approved listing units within a transaction are deducted from the original listing units so then the remaining listing units within the active listing objects reflects the new availability.

According to one embodiment, as part of the purchase/sale order execution process, the system can automatically email a pre-filled packing slip (showing the original values of their asset contributions itemizing the listing units in the order) and shipping instructions. In further embodiments, the system can simultaneously submit a call tag and a scheduled request via an API to pick up the prepared goods (e.g., with additional attempts, if necessary).

In some examples, the retailers are prompted to rate the transaction and have 48 hours to do so on the system. In another embodiment within the purchase/sale execution process, if the system receives notification that the call tag was canceled or refused by the provider, the system can notify the administrator, and submit another call tag request via API for a fee.

In another embodiment within the purchase/sale execution process, the system can execute shipments without the use of call tags by generating and emailing a shipping label to the provider.

In another embodiment, if the system receives notification that the call tag was canceled or refused by the provider, or that an order was not shipped out within an allotted time, the system can notify the administrator, cancel the transaction, charge the user at fault (who did not ship out) for fees and/or penalties, and refund the receiver.

In another embodiment, the system releases the funds to the provider upon the system receiving notification that the call tag pickup was successful.

In one embodiment, the system is notified when a shipment is delivered. Once the order is delivered, the system can be configured to enable a request for return authorization (RA), if needed. If no return authorization (RA) is requested within an allotted time, the system releases the funds to the provider and the order is marked as complete.

Once the transaction is rated and no RA is requested, the purchase/sale transaction is completed and no further action is taken. If the RA requested within the allotted time is approved, the system can simultaneously submit a call tag request via an API for another call tag in order to return the merchandise. The system can charge the provider for the amount of the RA and any fees, and refund the receiver, as necessary.

Example Processing for Swap Directory and Swap Initiation

According to another embodiment, the system maintains and displays a "Swap" directory in the user interface. The directory indexes listing objects available for exchange. For example, users that are willing to exchange products view the "Swap" directory are able to see the active listings which are available for swap (and for which they are authorized). For example, users are able to browse the listings of only the brands that they are active for within the vendors' authorization objects. The authorized users of a respective vendor can view active listings and initiate a swap transaction. In other words, if different vendor goods are exchanged, each user must be authorized for both vendors. In in further example, is multiple users introduce additional vendor goods and/or brands, then two way authorization on each associated good/user is required for the exchange to proceed.

According to one embodiment, the system can be configured to limit swap transactions to be requested and executed pertaining to the same vendor and their respective products; and the system can even prevent authorized users of multiple vendors from exchanging one vendor's product for a different vendor's product.

In another aspect, the system is configured to enable users to sort listing by a variety of options, including proximity and rating. For example, if a user sees a same product listed by three providers, they can sort by distance so that they can select the one that would arrive to them quickest, or rating to assume which user is most likely to deliver the best experience.

According to various embodiments, a user can view a listing, select the sizes/quantities and choose "REQUEST SWAP" to initiate a swap transaction, shown for example in FIG. 9. According to another embodiment, the requesting user can be prompted to view additional listings from the same provider for the same vendor in order to increase the provider's total transaction contribution within the request. In another embodiment, listing units requested in a swap transaction are not reserved and can be requested in more than one swap transaction until a transaction is approved.

Example Processing for Swap Transactions and Order Execution

According to another embodiment, the system can executed a process for an exchange of goods (i.e., a swap) that can be partial, complete, or with any difference ignored (e.g., "Call it Even"). The swap process handles correspondence through a set of predetermined actions and responses, calculates the differences in swap values and collects payments due, schedules shipping and concludes the transaction with a rating prompt.

According to various embodiments, functions and process flows executed on the system can include the description of a user initiating a swap transaction as the receiver and the user with the listing object as the provider. In one embodiment, the system initiates a swap transaction between the receiver and the provider when a user requests a swap request. The system can be configured to notify the provider to "View the Swap Options" (e.g., view the receiver's listings or proposed exchange), either in the user interface or via another communication channel (e.g., text, voice, e-mail, push notification, etc.).

According to another embodiment, the system can execute a process for an exchange of goods (i.e., a swap) that is determined by the system to have the same value for the respective parties. For example, the transaction contributions of listing units from both the receiver and the provider are analyzed by the system and determined to equate before the system permits the exchange operations to proceed (as shown in figure H-3).

In one aspect, the system manages transaction contributions which can be listing units or monetary value. In one example, the value of the transaction contribution is automatically set to the value of the listing unit if it is a unit contribution (e.g., a listing unit's information is captures from a product data object on the system).

In other embodiments, unit based contributions and monetary contributions can be made as part of a swap transaction, where the difference between the total listing units of the provider and the receiver is the basis for an additional monetary contribution.

According to another embodiment, the system can also be configured to permit exchanges where the exchange of goods (i.e., a swap) results in uneven valuations. For example, one user contributes more value in listing units than the other, resulting in the deficient user making transaction contributions of both listing units and monetary value until both transaction contributions are equal.

In another embodiment, if there is a cost "gap" in a swap transaction, then one user can modify listing units from both the provider and receiver's listings involved in the swap transaction to mitigate the difference in contribution values and submit the change to the transacting retailer for approval.

According to another embodiment, the system can execute a process for an exchange of goods (i.e., a swap) where the provider and the receiver make uneven contributions and choose to ignore the difference (e.g., "Call it Even").

For example of the swap process, once a swap request is submitted, the system creates a draft swap transaction. The system calculates the provider's transaction contribution by totaling the value of the listing units selected by the receiver. The system can be configured to provide an option for the provider to select what they want the receiver to contribute by prompting the provider to view the receiver's listings.

According to another aspect, the system is configured to able transacting users to select the transaction contributions on behalf of each other. For example, where the provider's transaction contribution have been selected by the receiver (including for example, the listing units), and the receiver's transaction contribution have been selected by the provider (including the listing units). According to various embodiments, the system is configured to enable each party of a proposed swap transaction to decide (and select in the UI) what the other one will be contributing to the exchange rather than what they will be contributing. These embodiments, reverse the conventional execution of a convention exchange. In so doing the system provides new functionality and changes the approach to exchange normally provided by conventional systems.

According to another embodiment, the system allows the participating users to review and respond to the swap request in the user interface. For example, the provider can view a summary of the listing units that were requested, browse the receiver's listings, select what they want in exchange, and submit a swap response.

In another embodiment, the system allows the participating users to decline a request. For example, the system enables the provider to decline the swap request in the user interface. In other example, the provider can view a summary of the listing units that were requested, browse the receiver's listings, and submit a decline.

In another embodiment, the system allows the provider to modify the swap request. For example, provider can view a summary of the listing units that were requested, browse the receiver's listings, select what they want in exchange, change the quantities on the provider's listing units that were requested, and submit a swap response.

In another embodiment, the system notifies the receiver of the provider's swap response and presents the summary of swap contributions, reflecting both the provider's and receiver's listing units being exchanged in the transaction. If, for example, the listing unit contributions of the receiver and the provider are not equal, the system will reveal the amount of additional contributions that are required in the form of money to make the transaction equal.

In another embodiment, the system allows the receiver to approve the swap response. For example, if the summary of swap contributions is acceptable to the receiver, they can approve the transaction and proceed to payment.

In another embodiment, if a user is owed funds from a swap transaction due to unequal listing unit contributions, the system can deduct the cost of shipping and administrative fees from the amount due to the recipient user, resulting in less, or sometimes no payout to the user.

In another embodiment, the system allows the receiver to decline the swap transaction. For example, receiver can view the summary of swap contributions (e.g., what they would be "swapping out" and what they would be "receiving in exchange") and submit a decline.

In another embodiment, when the provider's and receiver's listing unit contributions are uneven within a swap transaction, with one user owing an additional monetary contribution, resulting in them declining the transaction request with the reason of "The amount I have to pay is too high," the system can allow the deficient user to request a "Call It Even."

According to the embodiment called the "Call It Even" the system can enable functionality to excuse the difference in value between users' listing contributions and display an interface for the user to approve.

In other instances, for example, when a vendor is moving inventory between freestanding stores and the swap transaction has uneven listing unit contributions between the two users, the system can dismiss the additional monetary contributions normally required (similar to the "Call It Even" execution flow discussed below).

In another embodiment, the system allows the receiver to modify the swap transaction after the provider has responded. For example, receiver can view the summary of swap contributions and if the monetary value of transaction contribution they would need to provide displeases them, or for example, if they no longer have a listing unit available, the user can adjust the transaction contribution totals of both the receiver and the provider by adding or removing listing objects, or, changing quantities of listing units to make a more favorable balance due.

In another embodiment, the system requires the swap transaction to be re-submitted to the other transacting user each time a swap transaction is modified. For example, the provider and receiver can go back and forth multiple times before both are in agreement and approve the swap transaction.

According to one embodiment, the system can process two charges for a single user in a swap transaction. For example, a charge for payment due (if any) and a separate pre-authorization for the amount of the user's total listing unit transaction contributions, in case of return authorization for part or all of the order.

In another embodiment, if the user's payment method is denied for the charge due or the pre-authorization amount, the system requires the user to choose a different payment method until payment confirmation is received.

According to one embodiment, a specific swap execution process is followed. For example, upon a user agreeing to the swap summary, the system prompts the participants to input payment information for any charges, if due, and the pre-authorization amounts for both parties. In one example, the system can notify the transacting user of the swap approval and prompt them to input their payment information. Upon the system receiving payment and/or pre-authorizations from both users, the system then automatically emails each user a pre-filled packing slip (specifying their listing units) and shipping instructions.

According to another embodiment, if a user does not make payment for an approved swap transaction in the allotted time, the transacting user's payment can be refunded and the system can cancel the transaction.

In another embodiment within the swap execution process, the system can submit two separate call tag requests (via an API to a shipping service, one for the receiver and one for the provider) to pick up each order at each user's location on the next business day and for two additional attempts, if necessary.

In another embodiment within the swap execution process, if the system receives notification that the call tag was canceled or refused by the listing user for a swap transaction, the system can notify the administrator, and submit another call tag request via API for a fee. In some embodiments, the system can trigger a hold on the other parties shipment. To ensure that any issues are resolved before receipt by a non-performing party.

In an example enhancement to the swap execution process, according to one embodiment the system can execute shipments without the use of call tags by generating and emailing a shipping label for each user.

In an example enhancement to the swap execution process, according to one embodiment, if the system receives notification that the call tag was canceled or refused by a user within a swap transaction, or that an order was not shipped out within an allotted time, the system can notify the administrator, cancel the transaction and charge (or penalize) the user at fault (who did not ship out) for the merchandise they received.

In an example enhancement to the swap execution process, according to one embodiment the system limits the amount of time the receiver and provider have to request a return authorization (RA) once the merchandise has been delivered. If the RA is requested within the allotted time and is approved, the system submits another call tag request via the API to return the merchandise. The system can charge the user at fault for the amount of the RA units and any fees, and the claimant is paid out, as necessary.

In one embodiment, the system is notified when a shipment is delivered. If no RA is requested within an allotted time, the system releases the funds to the due user and the order is marked as complete. In another embodiment, the system releases the funds to the due user upon the system receiving notification that the call tag pickup was successful.

Example Processing for Call it Even

According to another aspect, the system manages exchange execution where the total contributions of listing units for each user are not even, causing swap transactions to be declined due to the deficient user not wanting to make an additional monetary contribution. According to another embodiment, the system can be configured to prompt the user with the higher listing contribution with the option to excuse the difference in swap value before submitting their swap response to the deficient user.

According to some embodiments, the system is configured to permit the user with the deficient listing contribution to request the difference in swap value to be excused by the transacting user. In another example, the user having the greater value of contributions can prompt the system to excuse the difference.

In one embodiment, if a retailer declines a swap request because "The difference I have to pay is too high," and the transacting retailer agrees to "Call It Even," the system does not require an additional cash contribution and equates the value between the provider and receiver's contributions, adjusting any transaction fee to equal the higher of the two values. According to various embodiments, responsive to a call it even execution, the system is configured to set the transaction value at the higher contribution amount and calculates any fees (e.g., operational fees of the system) of the former deficient user at the higher value. In further embodiments, the system is configured to present the new swap summary through the user interface to the deficient user and generate prompts for the user to review the new total due (e.g., fees and shipping costs). The user interface can include a display that enable the user to trigger a "Call It Even" request.

According to one embodiment, the system is configured to notify the transacting user of the swap decline and present the "Call It Even" summary through the user interface. As part of the UI display, the system is configured to present options of "Approve" and "Decline" for selection in the display.

In one example scenario, the transacting user approves the "Call It Even" function and the system prompts both users to make payment under the call it even terms. Once payment/reconciliation occurs, the above discussed swap order execution process is executed. In another example scenario, the transacting user declines the "Call It Even" request and the system closes out the transaction request with no further action.

Example Computer System

Figure 23:
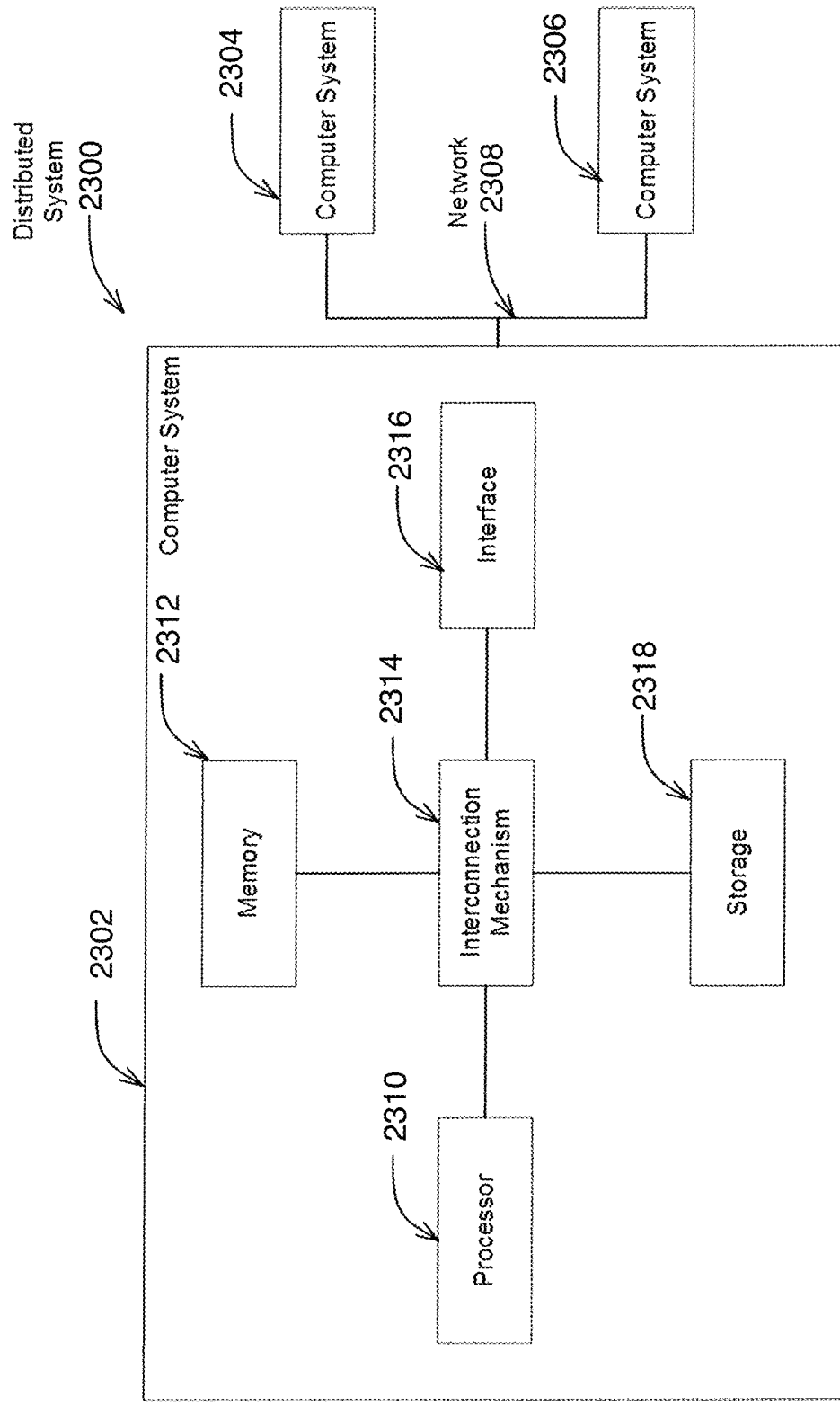
FIG. 23 is an example special purpose computer system on which various embodiments and aspects can be practiced.

Referring to FIG. 23, there is illustrated a block diagram of a specially configured distributed computer system 2300, in which various aspects and functions are practiced. As shown, the distributed computer system 2300 includes one or more computer systems that exchange information. More specifically, the distributed computer system 2300 includes computer systems 2302, 2304, and 2306. As shown, the computer systems 2302, 2304, and 2306 are interconnected by, and may exchange data through, a communication network 2308. The network 2308 may include any communication network through which computer systems may exchange data. To exchange data using the network 2308, the computer systems 2302, 2304, and 2306 and the network 1108 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 2302, 2304, and 2306 may transmit data via the network 2308 using a variety of security measures including, for example, SSL or VPN technologies. While the distributed computer system 2300 illustrates three networked computer systems, the distributed computer system 2300 is not so limited and may include any number of computer systems and computing devices, networked using any medium and communication protocol.

As illustrated in FIG. 11, the computer system 2302 includes a processor 2310, a memory 2312, an interconnection element 1114, an interface 1116 and data storage element 1118. To implement at least some of the aspects, functions, and processes disclosed herein, the processor 2310 performs a series of instructions that result in manipulated data. The processor 2310 may be any type of processor, multiprocessor or controller. Example processors may include a commercially available processor such as an Intel Xeon, Itanium, Core, Celeron, or Pentium processor; an AMD Opteron processor; an Apple A10 or A5 processor; a Sun UltraSPARC processor; an IBM Power5+ processor; an IBM mainframe chip; or a quantum computer. The processor 2310 is connected to other system components, including one or more memory devices 2312, by the interconnection element 2314.

The memory 2312 stores programs (e.g., sequences of instructions coded to be executable by the processor 2310) and data during operation of the computer system 2302. Thus, the memory 2312 may be a relatively high performance, volatile, random access memory such as a dynamic random access memory ("DRAM") or static memory ("SRAM"). However, the memory 2312 may include any device for storing data, such as a disk drive or other nonvolatile storage device. Various examples may organize the memory 2312 into particularized and, in some cases, unique structures to perform the functions disclosed herein. These data structures may be sized and organized to store values for particular data and types of data.

Components of the computer system 2302 are coupled by an interconnection element such as the interconnection mechanism 2314. The interconnection element 2314 may include any communication coupling between system components such as one or more physical busses in conformance with specialized or standard computing bus technologies such as IDE, SCSI, PCI and InfiniBand. The interconnection element 2314 enables communications, including instructions and data, to be exchanged between system components of the computer system 2302.

The computer system 2302 also includes one or more interface devices 2316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 2302 to exchange information and to communicate with external entities, such as users and other systems.

The data storage element 2318 includes a computer readable and writeable nonvolatile, or non-transitory, data storage medium in which instructions are stored that define a program or other object that is executed by the processor 2310. The data storage element 2318 also may include information that is recorded, on or in, the medium, and that is processed by the processor 2310 during execution of the program. More specifically, the information may be stored in one or more data structures specifically configured to conserve storage space or increase data exchange performance. The instructions may be persistently stored as encoded signals, and the instructions may cause the processor 2310 to perform any of the functions described herein. The medium may, for example, be optical disk, magnetic disk or flash memory, among others. In operation, the processor 2310 or some other controller causes data to be read from the nonvolatile recording medium into another memory, such as the memory 2312, that allows for faster access to the information by the processor 2310 than does the storage medium included in the data storage element 2318. The memory may be located in the data storage element 2318 or in the memory 2312, however, the processor 2310 manipulates the data within the memory, and then copies the data to the storage medium associated with the data storage element 2318 after processing is completed. A variety of components may manage data movement between the storage medium and other memory elements and examples are not limited to particular data management components. Further, examples are not limited to a particular memory system or data storage system.

Although the computer system 2302 is shown by way of example as one type of computer system upon which various aspects and functions may be practiced, aspects and functions are not limited to being implemented on the computer system 2302 as shown in FIG. 23. Various aspects and functions may be practiced on one or more computers having a different architectures or components than that shown in FIG. 23. For instance, the computer system 2302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 2302 may be a computer system including an operating system that manages at least a portion of the hardware elements included in the computer system 2302. In some examples, a processor or controller, such as the processor 2310, executes an operating system. Examples of a particular operating system that may be executed include a Windows-based operating system, such as, Windows NT, Windows 2000 (Windows ME), Windows XP, Windows Vista or Windows 7, 8, or 11 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 2310 and operating system together define a computer platform for which application programs in high-level programming languages are written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An exchange system, the system comprising:
at least one processor operatively connected to a memory;
an authorization component, executed by the at least one processor, configured to:
 accept definition of brand authorization objects, each brand authorization object including an association linking one or more authenticated users and a data element specifying an authorization attribute associated with a respective product brand;
a restriction component, executed by the at least one processor, configured to:
 determine, based on the brand authorization objects, for authenticated users of the exchange system, a subset of the authenticated users having an authorization to generate listing or request objects associated with the respective product brand; and
 limit, responsive to user input in a user interface, based on the brand authorization objects, access to functions executed on the system that are configured to generate or display the listing or request objects associated with the respective product brand to the subset of authenticated users having the authorization to create listing or request objects associated with the respective product brand;

an exchange component configured to enable users to:
  generate listing or request objects associated with the respective product brand specifying one or more listing items for exchange with at least one other authenticated user having the authorization to generate listing or request objects associated with the respective product brand;
  define the listing or the request objects for execution of a brand-to-brand exchange on the system, wherein the exchange component requires specification of a product brand stored in a product brand database to generate the listing or request object without custom processing; and a reconciliation component configured to manage execution of the brand-to-brand exchange defined by the listing or request object.

2. The exchange system of claim 1, wherein managing execution of the brand-to-brand exchange defined by the listing or request object comprises:
  generating one or more shipping labels for transferring one or more products associated with the listing or request object; and
  providing the one or more shipping labels to a user associated with the listing or request object.

3. The exchange system of claim 1, wherein managing execution of the brand-to-brand exchange defined by the listing or request object comprises:
  generating one or more call tags for transferring one or more products associated with the listing or request object; and
  scheduling a request to pick up, with the one or more call tags, the one or more products associated with the listing or request object.

4. The exchange system of claim 1, wherein the authorization component is further configured to:
  authenticate one or more retailers;
  register, for each of the one or more authenticated retailers, retailer credentials for accessing the exchange system; and
  link the retailer credentials with the data element specifying the authorization attribute associated with a respective product brand.

5. The exchange system of claim 4, wherein authenticating a retailer comprises determining that the retailer received a valid invitation to the exchange system.

6. The exchange system of claim 4, wherein authenticating a retailer comprises determining that the retailer has a verified store location and/or website.

7. The exchange system of claim 1, wherein accepting the definition of a brand authorization object comprises accepting the definition of the brand authorization object from one or more vendors or managers of a product brand.

8. The exchange system of claim 1, wherein:
  enabling users to define the listing or the request objects for execution of the brand-to-brand exchange on the system comprises:
    enabling a first user to define a first listing or request object specifying first one or more products; and
    enabling a second user to define a second listing or request object specifying second one or more products,
  the exchange component is further configured to determine, based on the first one or more product objects and the second one or more products, a difference in value, and
  managing execution of the brand-to-brand exchange defined by the listing or request object comprises reconciling value between the first user and the second user based on the difference in value.

9. The exchange system of claim 8, wherein reconciling the value between the first user and the second user based on the difference in value comprises determining a monetary payment between the first user and the second user.

10. The exchange system of claim 8, wherein reconciling value between the first user and the second user based on the difference in value comprises reconciling the value between the first user and the second user based on shipping costs for transferring the first one or more products and/or the second one or more products.

11. The exchange system of claim 10, wherein reconciling the value between the first user and the second user based on the shipping costs for transferring the first one or more products and/or the second one or more products comprises deducting the shipping costs from the difference in value.

12. A method of executing a brand-to-brand exchange, the method comprising:
  accepting definition of brand authorization objects, each brand authorization object including an association linking one or more authenticated users and a data element specifying an authorization attribute associated with a respective product brand;
  determining, based on the brand authorization objects, for authenticated users of the exchange system, a subset of the authenticated users having an authorization to generate listing or request objects associated with the respective product brand; and
  limiting, responsive to user input in a user interface, based on the brand authorization objects, access to functions executed on the system that are configured to generate or display the listing or request objects associated with the respective product brand to the subset of authenticated users having the authorization to create listing or request objects associated with the respective product brand;
  enabling users to generate listing or request objects associated with the respective product brand specifying one or more listing items for exchange with at least one other authenticated user having the authorization to generate listing or request objects associated with the respective product brand;
  enabling users to define the listing or the request objects for execution of a brand-to-brand exchange on the system and requiring specification of a product brand stored in a product brand database to generate the listing or request object without custom processing; and
  managing execution of the brand-to-brand exchange defined by the listing or request object.

13. The method of claim 12, wherein managing execution of the brand-to-brand exchange defined by the listing or request object comprises:
  generating one or more shipping labels for transferring one or more products associated with the listing or request object; and
  providing the one or more shipping labels to a user associated with the listing or request object.

14. The method of claim 12, further comprising:
  authenticating one or more retailers;
  registering, for each of the one or more authenticated retailers, retailer credentials for accessing the exchange system; and linking the retailer credentials with the data element specifying the authorization attribute associated with a respective product brand.

15. The method of claim 12, wherein:
enabling users to define the listing or the request objects for execution of the brand-to-brand exchange on the system comprises:
    enabling a first user to define a first listing or request object specifying first one or more products; and
    enabling a second user to define a second listing or request object specifying second one or more products,
the method further comprises determining, based on the first one or more product objects and the second one or more products, a difference in value, and
managing execution of the brand-to-brand exchange defined by the listing or request object comprises reconciling value between the first user and the second user based on the difference in value.

16. The method of claim 15, wherein reconciling value between the first user and the second user based on the difference in value comprises reconciling the value between the first user and the second user based on shipping costs for transferring the first one or more products and/or the second one or more products.

17. At least one non-transitory computer-readable storage medium encoded with computer-readable instructions that, when executed by at least one processor, cause the at least one processor to perform a method of executing a brand-to-brand exchange, the method comprising:
    accepting definition of brand authorization objects, each brand authorization object including an association linking one or more authenticated users and a data element specifying an authorization attribute associated with a respective product brand;
    determining, based on the brand authorization objects, for authenticated users of the exchange system, a subset of the authenticated users having an authorization to generate listing or request objects associated with the respective product brand; and
    limiting, responsive to user input in a user interface, based on the brand authorization objects, access to functions executed on the system that are configured to generate or display the listing or request objects associated with the respective product brand to the subset of authenticated users having the authorization to create listing or request objects associated with the respective product brand;
    enabling users to generate listing or request objects associated with the respective product brand specifying one or more listing items for exchange with at least one other authenticated user having the authorization to generate listing or request objects associated with the respective product brand;
    enabling users to define the listing or the request objects for execution of a brand-to-brand exchange on the system and requiring specification of a product brand stored in a product brand database to generate the listing or request object without custom processing; and
    managing execution of the brand-to-brand exchange defined by the listing or request object.

18. The at least one non-transitory computer-readable storage medium of claim 17, wherein managing execution of the brand-to-brand exchange defined by the listing or request object comprises:
    generating one or more call tags for transferring one or more products associated with the listing or request object; and
    scheduling a request to pick up, with the one or more call tags, the one or more products associated with the listing or request object.

19. The at least one non-transitory computer-readable storage medium of claim 17, wherein the method further comprises:
    authenticating one or more retailers;
    registering, for each of the one or more authenticated retailers, retailer credentials for accessing the exchange system; and
    linking the retailer credentials with the data element specifying the authorization attribute associated with a respective product brand.

20. The at least one non-transitory computer-readable storage medium of claim 17, wherein:
    enabling users to define the listing or the request objects for execution of the brand-to-brand exchange on the system comprises:
        enabling a first user to define a first listing or request object specifying first one or more products; and
        enabling a second user to define a second listing or request object specifying second one or more products,
    the method further comprises determining, based on the first one or more product objects and the second one or more products, a difference in value, and
    managing execution of the brand-to-brand exchange defined by the listing or request object comprises reconciling value between the first user and the second user based on the difference in value.

* * * * *